(12) United States Patent
Santos et al.

(10) Patent No.: US 7,412,900 B2
(45) Date of Patent: Aug. 19, 2008

(54) SENSOR MOUNTING STRUCTURE WITH ADJUSTABLE SWIVEL BALL AND PANEL MOUNTING MECHANISM

(75) Inventors: Roberto S. Santos, Hudson, MA (US); Mark S. Schladenhauffen, Westford, MA (US); Dennis C. Mackey, Hamilton, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 85 days.

(21) Appl. No.: 11/240,033

(22) Filed: Sep. 30, 2005

(65) Prior Publication Data

US 2007/0074582 A1   Apr. 5, 2007

(51) Int. Cl.
*G01N 3/02* (2006.01)
(52) U.S. Cl. .......................................... 73/856; 73/855
(58) Field of Classification Search ............. 73/855, 73/856
See application file for complete search history.

(56) References Cited

U.S. PATENT DOCUMENTS

| | | | |
|---|---|---|---|
| 1,895,179 A | 1/1933 | Thresher | |
| 2,497,456 A | 2/1950 | Johnson | 74/424.8 |
| 2,791,905 A | 5/1957 | Cheney | |
| 3,010,363 A | 11/1961 | Malfeld | 88/40 |
| 3,213,189 A | 10/1965 | Mitchell et al. | |
| 3,281,660 A | 10/1966 | Studenick | |
| 3,354,302 A | 11/1967 | Greasley | 240/8.16 |
| 3,576,563 A | 4/1971 | Scott et al. | 340/380 |
| 3,750,466 A | 8/1973 | Ott et al. | |
| 4,262,181 A | 4/1981 | Tufano et al. | 200/296 |
| 4,505,054 A | 3/1985 | Clark et al. | 33/357 |
| 4,510,408 A | 4/1985 | Jovick et al. | 310/168 |
| 4,515,336 A | 5/1985 | Fischer | 248/288.3 |

(Continued)

FOREIGN PATENT DOCUMENTS

DE    19626291 A1    1/1998

(Continued)

OTHER PUBLICATIONS

MH15: Short housing, clever mounting—for smart solutions Data Sheets, SICK AG.

(Continued)

*Primary Examiner*—Edward Lefkowitz
*Assistant Examiner*—Freddie Kirkland, III
(74) *Attorney, Agent, or Firm*—Whyte Hirschboeck Dudek SC; William R. Walbrun

(57) ABSTRACT

A mounting device for supporting a sensing device in relation to a supporting structure, and related method of installing a sensing device, are disclosed. In at least some embodiments, the mounting device includes a first housing portion having a first appendage, and a second housing portion having a second appendage, where the second housing portion is slidable in relation to the first housing portion. The mounting device further includes an actuating portion capable of causing sliding movement between the housing portions, where the sensing device is supported within at least one of the housing portions. In some embodiments, a rotatable swivel ball on which the sensing device is supported is contained within at least one of the housing portions, and actuation of the actuating portion results in both the coupling of the mounting device to a supporting structure and a setting of a position of the swivel ball.

75 Claims, 7 Drawing Sheets

U.S. PATENT DOCUMENTS

| | | | |
|---|---|---|---|
| 4,633,081 A | 12/1986 | Hiramatu et al. | |
| 4,798,964 A | 1/1989 | Schmalfuss et al. | |
| 4,805,455 A | 2/1989 | DelGiorno et al. | |
| 5,195,364 A | 3/1993 | Dehe et al. | |
| 5,205,042 A | 4/1993 | Greter et al. | |
| 5,412,816 A | 5/1995 | Paterson et al. | |
| 5,542,859 A | 8/1996 | Ison et al. | 439/536 |
| 5,617,762 A | 4/1997 | Kirsch | 74/490.06 |
| 5,621,370 A | 4/1997 | St. Louis | 337/380 |
| 5,806,955 A | 9/1998 | Parkyn, Jr. et al. | 362/31 |
| 5,938,310 A | 8/1999 | Leaman et al. | |
| 5,954,310 A | 9/1999 | Soldo et al. | 248/660 |
| 5,966,991 A | 10/1999 | Gosselin et al. | 74/490.01 |
| 6,025,963 A | 2/2000 | Hippenmeyer et al. | 359/819 |
| 6,033,100 A | 3/2000 | Marquiss et al. | |
| 6,147,820 A | 11/2000 | Anselment et al. | 359/823 |
| 6,204,501 B1 | 3/2001 | Cutler | 250/352 |
| 6,227,501 B1 * | 5/2001 | Malcolm | 248/27.3 |
| 6,244,107 B1 | 6/2001 | Nelson et al. | 73/431 |
| 6,318,694 B1 | 11/2001 | Watanabe | 248/371 |
| 6,322,275 B1 | 11/2001 | Schmidt et al. | 403/14 |
| 6,352,037 B1 | 3/2002 | Doyle | 108/20 |
| 6,360,999 B1 | 3/2002 | Liao | 248/27.1 |
| 6,441,361 B1 | 8/2002 | Bennett, Jr. et al. | 250/221 |
| 6,550,679 B2 | 4/2003 | Hennick et al. | 235/454 |
| 6,599,049 B2 | 7/2003 | Erben | 403/27 |
| 6,614,601 B2 | 9/2003 | Dallakian | 359/804 |
| 6,632,008 B2 | 10/2003 | Kalkbrenner | 362/554 |
| 6,720,884 B2 | 4/2004 | O'Connor et al. | 340/643.6 |
| 6,760,206 B2 | 7/2004 | Daharsh et al. | 361/93.1 |
| 6,799,376 B1 | 10/2004 | Voeller et al. | |
| 6,858,172 B2 | 2/2005 | Daharsh et al. | 264/272.14 |
| 6,892,594 B2 | 5/2005 | Buck et al. | 73/866.5 |
| 6,937,812 B2 | 8/2005 | Schladenhauffen et al. | 385/146 |
| 7,256,891 B2 | 8/2007 | Domack et al. | |
| 2003/0211041 A1 | 11/2003 | Ezratty et al. | |
| 2004/0031385 A1 | 2/2004 | Neuhaeuser | 92/5 |
| 2004/0049353 A1 | 3/2004 | Ezratty | |
| 2004/0175988 A1 * | 9/2004 | Chang et al. | 439/552 |
| 2005/0263964 A1 | 12/2005 | Kumoi | |
| 2007/0074583 A1 * | 4/2007 | Santos et al. | 73/856 |
| 2007/0074591 A1 * | 4/2007 | Santos et al. | 73/866.5 |

FOREIGN PATENT DOCUMENTS

| | | |
|---|---|---|
| EP | 0037896 B1 | 2/1985 |
| FR | 2531568 A1 | 2/1984 |
| GB | 2311805 A | 10/1997 |
| JP | 62236742 A | 10/1987 |
| WO | 97/48578 A | 12/1997 |

OTHER PUBLICATIONS

EC Declaration of Conformity, SICK.
Photoelectric Sensors, Accessories, p. 638, 2000 Edition, SICK.
SMB18S Swivel Mount Bracket datasheet, Oct. 2002., Banner.
Sensor Accessories Sensor Mounting Brackets data sheets, pp. 1-3, Eaton Cutler-Hammer, Jun. 2004.
Installation Accessories data sheets, Micro Detectors, Jan. 2003.
Sensor Brackets and Accessories 2004-2005 (link to pdf file), http://www.softnoze.com/catalog.cfm.
ProxPort™ Mount & Conversion Brackets datasheet, Softnoze USA, Inc.
Swivel-style Universal Brackets (SUB) datasheets, Softnoze USA, Inc.
Accessories—Cables and Connectors—Brackets, pp. 740-754, Banner Engineering Corp., www.bannerengineering.com.
Fixing Brackets and Supports, Sensor Accessories, ST Series datasheets, Datasensor.
Photoswitch® Photoelectric Sensors, Introduction, pp. R1-17 to R1-19, Allen-Bradley.
Photoswitch® Photoelectric Sensors, Accessories, Contents, pp. 1-374 to 1-379, Allen-Bradley.
Sentek Econorush Sensor Holder, Sentek Limited UK, http://www.sentek.co.uk/econrush.htm.
Rosheim, Mark E., Mechanical Design of an Omni-Directional Sensor Mount abstract, http://www.stormingmedia.us/04/0448/A044804.html.

* cited by examiner

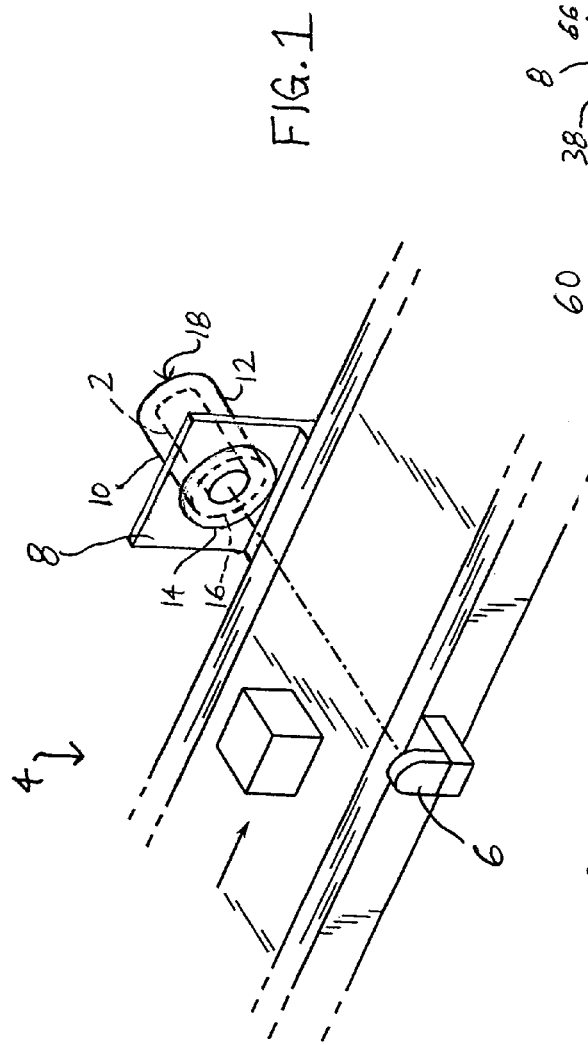
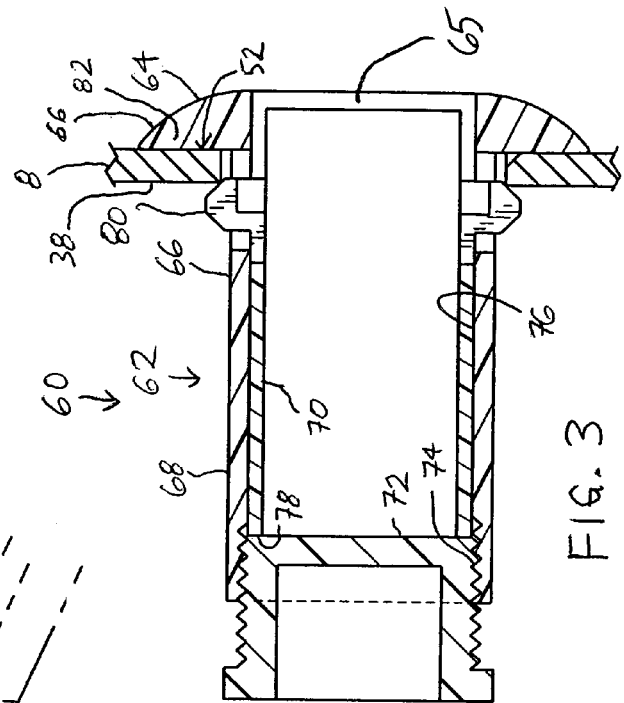
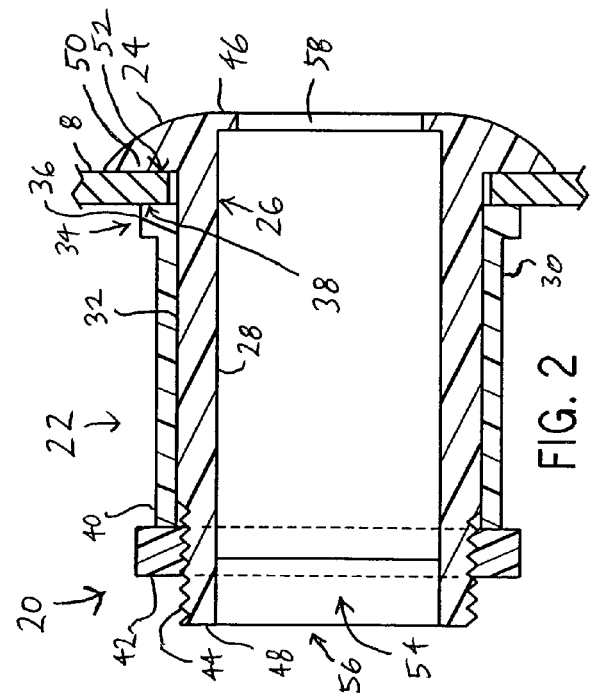

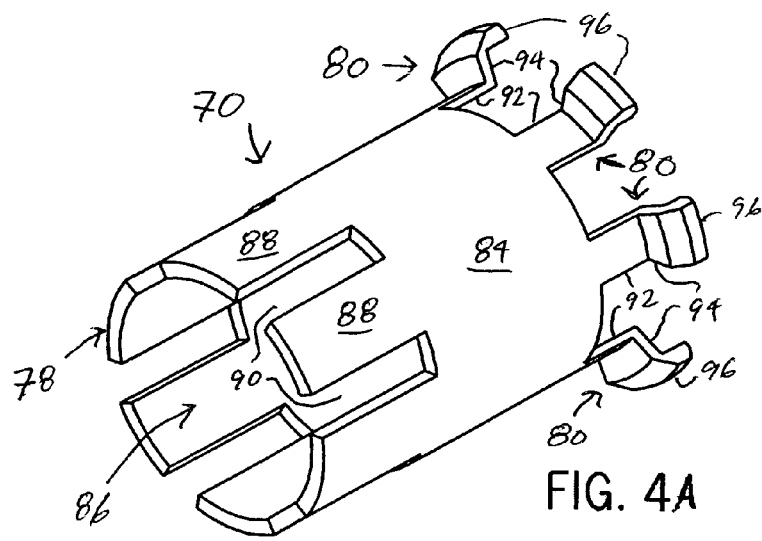
FIG. 4A
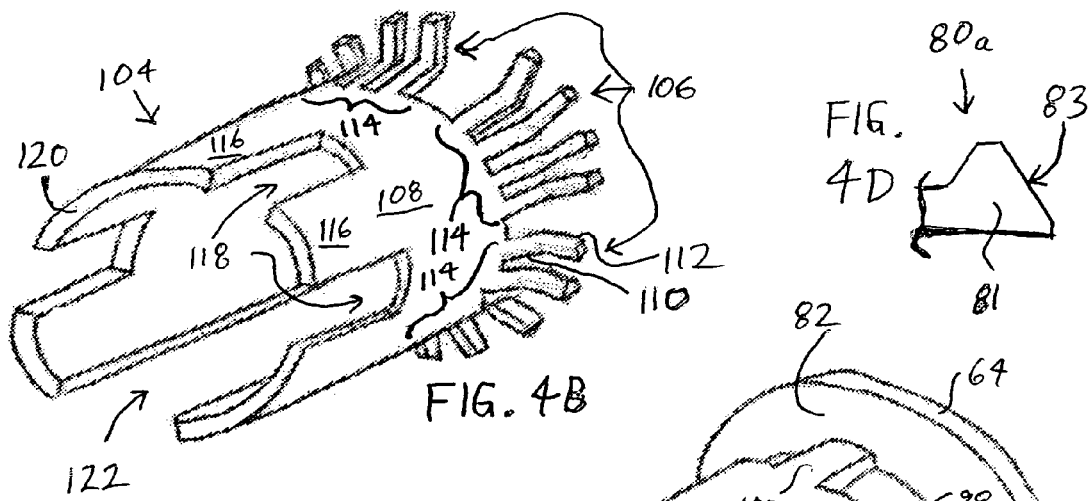
FIG. 4B
FIG. 4D
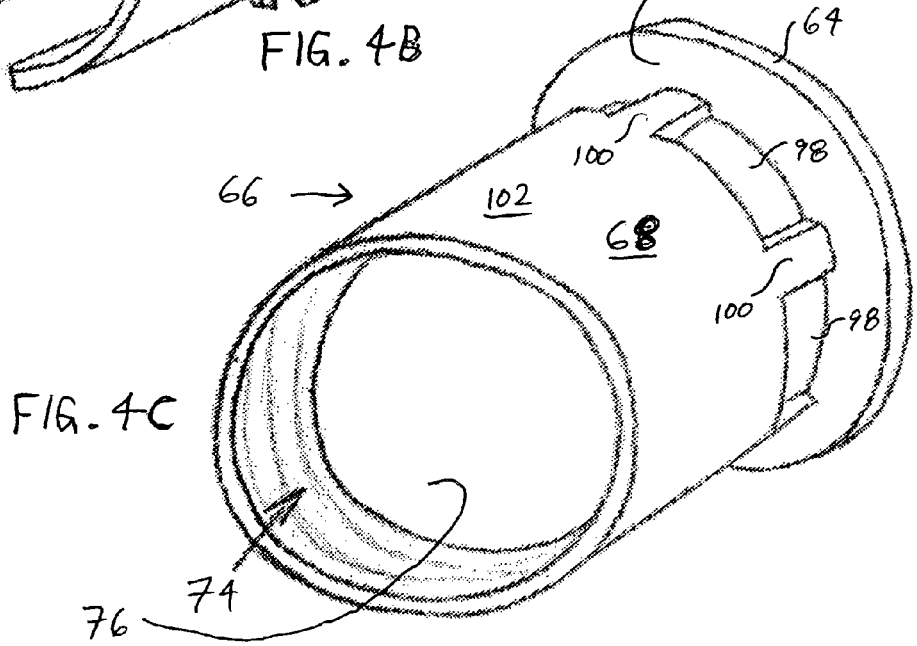
FIG. 4C

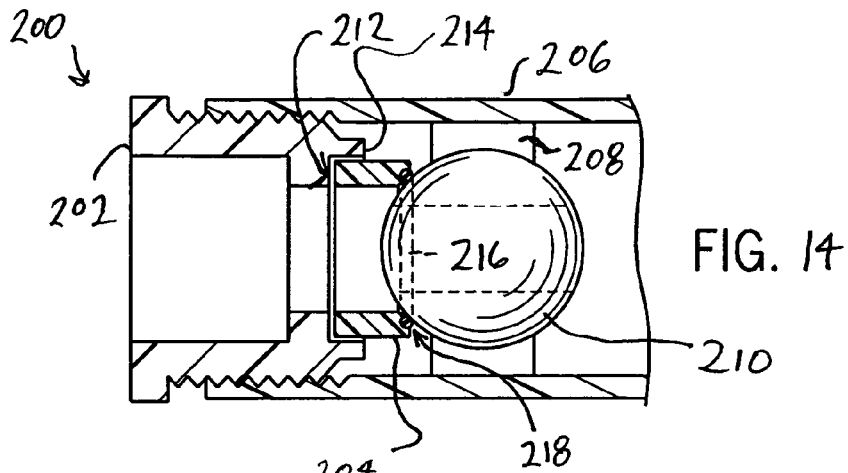
FIG. 14
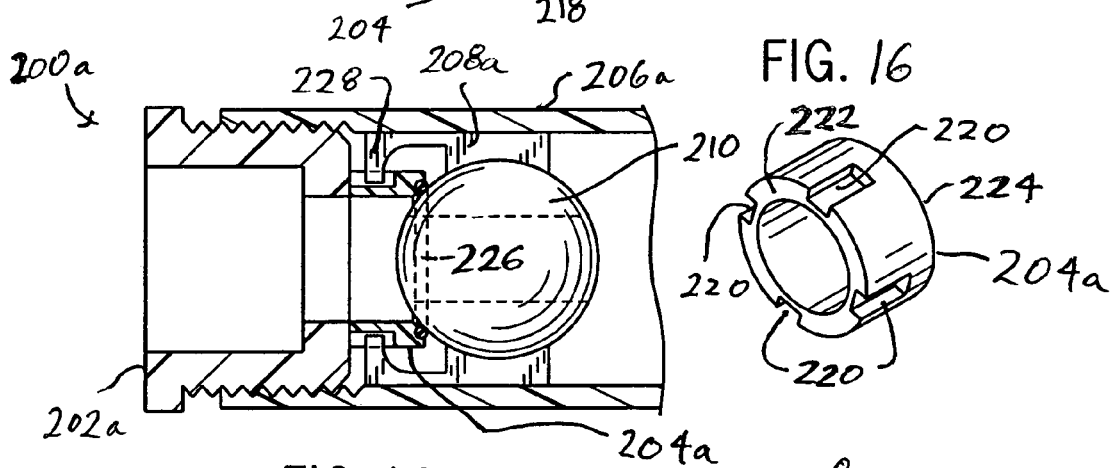
FIG. 15
FIG. 16
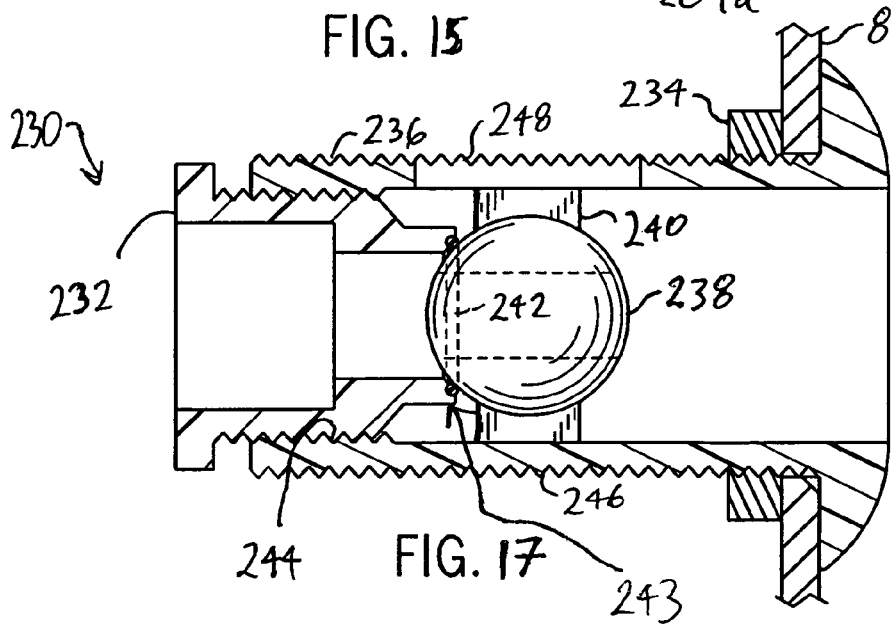
FIG. 17

SENSOR MOUNTING STRUCTURE WITH ADJUSTABLE SWIVEL BALL AND PANEL MOUNTING MECHANISM

CROSS-REFERENCE TO RELATED APPLICATIONS

STATEMENT REGARDING FEDERALLY SPONSORED RESEARCH OR DEVELOPMENT

FIELD OF THE INVENTION

The present invention relates to sensing devices and, more particularly, relates to various mechanisms, structures and/or methods for mounting sensing devices onto other structures.

BACKGROUND OF THE INVENTION

Sensing devices of many different types are commonly employed in a variety of environments and applications. Sensing devices encompass a broad spectrum of devices including, for example, various light-sensing devices such as laser-sensing devices, light sensing devices that are capable of distinguishing among different colors of visible light, and devices for sensing various other types of radiation including infrared radiation or heat, microwave radiation, and x-ray radiation. Additionally, other sensing devices include, for example, devices that are capable of sensing the position of other structures, acoustic sensors, vibration sensors, motion sensors such as accelerometers, orientation sensors involving gyroscopes, and numerous other types of sensing devices.

Sensing devices are employed in a wide variety of industrial, commercial, military, residential and other environments and applications. For example, in industrial environments, light sensors are often employed in conjunction with conveyor systems such as those used in assembly lines. Such light sensors are often used to detect the presence of objects moving down an assembly line and to determine whether a given object has entered or exited a particular region of the assembly line. Light sensors of similar design can also be used in residential applications, for example, in connection with garage door openers. Also for example, in many commercial facilities as well as residential homes, various sensing devices are used in security systems in order to detect the presence of potential intruders within or nearby those facilities or homes. Sensing devices can further be implemented on vehicles, for example, to detect the presence of objects behind vehicles. Indeed, sensing devices are ubiquitous in today's modern world.

Although in some cases sensing devices are free-standing, typically sensing devices are mounted upon or in relation to other supporting structures. Further, in many if not most circumstances, it is desirable that the sensing devices be mounted in relation to such supporting structures in a fixed manner, or at least in a manner by which the location and orientation of a given sensing device relative to the supporting structure(s) and/or signal source(s) is known or predictable. For example, in the case of a light sensing device implemented in a manufacturing assembly line, it is typically desired that the light sensing device be fixedly orientated in a particular direction so as to be aligned to receive a light beam from a light source located elsewhere. The mounting of light sensing devices in other environments, such as in the case of garage door openers, similarly can entail the careful, fixed positioning of the sensing devices.

Although in many circumstances it is desirable for a sensing device to be mounted in a manner such that the position of the sensing device is accurately fixed or at least limited to being within a predictable or predetermined range, it is often difficult to install sensing devices such that the sensing devices are mounted in this manner. The panels, walls, protruding structures, and other supporting structures on which sensing devices are mounted can have a variety of different shapes, sizes, configurations, orientations and positions depending upon the circumstance. Consequently, mounting a sensing device onto a supporting structure by way of a simple procedure (e.g., simply attaching the sensing device to the supporting structure by way of bolts or screws) often does not result in a desired arrangement of the sensing device.

Although in some applications multiple sensing devices are intended to be respectively mounted on respective components of the same type in largely the same manner, in such cases there often still is insufficient standardization of the supporting structures or other related structures/devices to allow for the sensing devices to be mounted in a repetitive manner on the multiple structures without fine adjustment of the positioning of the individual sensing devices. Indeed, it is often the case that the supporting structures on which sensing devices are to be mounted are not designed or manufactured to the tolerances that should be satisfied in the positioning of the sensing devices to allow for proper operation of those sensing devices. Again for example with respect to assembly lines, while multiple light sensing devices might be respectively mounted on respective successive conveyor sections in an assembly line, fine adjustment of each of the positions of the sensing devices typically is still desirable to achieve proper alignment of those sensing devices with their respective light sources.

Given the above considerations, certain intermediary mounting structures or mechanisms have been developed that allow sensing devices to be mounted onto other supporting structures in manners that allow for some adjustment, in terms of the positioning of the sensing devices relative to the supporting structures (and/or other structures/devices, such as signal sources). Yet such conventional mounting mechanisms are limited in terms of their capabilities. In some cases, such conventional mounting mechanisms only allow very slight adjustments in the positioning of sensing devices relative to the supporting structures on which the sensing devices are being mounted via the mounting mechanisms. Also, the designs of many conventional mounting mechanisms make it difficult for persons installing sensing devices to achieve specific desired positions, that is, to finely adjust the positions of the sensing devices and set or lock the sensing devices in those positions.

Further, even where conventional mounting mechanisms allow for adjustment of the positioning of sensing devices, the process of installing the mounting mechanisms in relation to the supporting structures can complicate the positioning of the sensing devices. For example, some conventional mounting mechanisms employ a swivel ball on which a sensing device can be supported, where the swivel ball is captured between two semicircular brackets that are bolted together by bolts that simultaneously are used to bolt the entire assembly to a supporting bracket or wall. Such conventional mounting mechanisms can be difficult to install while at the same time achieving desired positioning of the swivel ball (and the sensing device), since the swivel ball can have a tendency to rotate in an uncontrolled manner or even fall out from between the brackets while a person installing the assembly is attempting to bolt the entire assembly to the supporting bracket/wall.

For at least these reasons, therefore, it would be advantageous if improved mounting mechanisms or structures for use in mounting sensing devices to other support structures could be developed. In particular, in at least some embodiments, it would be advantageous if such improved mounting mechanisms facilitated the accurate positioning of sensing devices with respect to other supporting structures and/or other structures or devices in a manner that allowed for significant variation in sensor positioning. Also, in at least some embodiments, it would be advantageous if the mounting mechanisms facilitated both installation and accurate positioning of the sensing devices in relation to supporting structures.

BRIEF SUMMARY OF THE INVENTION

The present inventor has recognized that a variety of improved mounting devices or mechanisms for mounting sensing devices to supporting structures could be developed. Further, the present inventor has recognized that, in accordance with at least some embodiments of the present invention, an improved mounting mechanism could employ first and second housing portions that were slidable relative to one another, where the relative positioning of the housing portions was determined at least in part based upon a third component, and where each of the housing portions was configured to include one or more appendages extending largely perpendicularly to an axis along which sliding motion could occur.

Given such a mounting mechanism, it would be possible to affix the mounting mechanism to a supporting structure simply by sliding the first and second housing portions in a manner such that the appendages were clamped on opposite sides of the supporting structure. Further, in at least some of these embodiments, it would additionally be possible to rotatably support a swivel ball within one (or possibly both) of the housing portions and also to configure the housing portions such that, as the housing portions were slid relative to one another in a manner tending to clamp onto a supporting structure, pressure was also applied upon the swivel ball tending to set or lock the rotational position of the swivel ball and any sensing device supported by the swivel ball.

More particularly, in at least some embodiments, the present invention relates to a mounting device for supporting a sensing device in relation to a supporting structure. The mounting device includes a first housing portion having a first appendage, and a second housing portion having a second appendage, where the second housing portion is slidable in relation to the first housing portion. The mounting device further includes an actuating portion capable of causing sliding movement between the first and second housing portions, where the sensing device is supported within at least one of the first and second housing portions.

Further, in at least some embodiments, the present invention relates to a mounting device for supporting a sensing device in relation to a supporting structure. The mounting device includes a tubular support component, and first means for rotatably supporting the sensing device in relation to the tubular support component. The mounting device additionally includes second means for substantially simultaneously coupling the tubular support component in relation to the supporting structure and setting a rotational position of the sensing device.

Additionally, in at least some embodiments, the present invention relates to a method of installing a sensing device. The method includes positioning the sensing device into a rotatable support component supported within a tubular housing, and inserting the tubular housing through an orifice in a panel. The method further includes actuating at least one component to produce relative motion between the tubular housing and at least one additional structure, where the actuating results in the housing being coupled to a supporting structure and also results in the rotatable support component being set in terms of a rotational position.

BRIEF DESCRIPTION OF THE DRAWINGS

FIG. 1 is a generalized perspective view of a sensing device implemented in one exemplary application, where the sensing device is mounted onto a supporting structure through the use of a mounting mechanism;

FIG. 2 is a side elevation, cross-sectional view of one exemplary embodiment of a mounting mechanism that is being utilized to mount a sensing device onto a panel-type supporting structure;

FIG. 3 is a side elevation, cross-sectional view of another exemplary embodiment of a mounting mechanism that is being utilized to mount a sensing device onto a panel-type supporting structure;

FIG. 4A is a perspective view of a sleeve component that is utilized in the mounting mechanism of FIG. 3;

FIG. 4B is a perspective view of an alternative embodiment of the sleeve component of FIG. 4A;

FIG. 4C is a perspective view of a housing component that is utilized in the mounting mechanism of FIG. 3;

FIG. 4D is a cutaway view of an alternate embodiment of a tab that can be employed in the sleeve component of FIG. 4A;

FIG. 14 is a side elevation, cross-sectional view of a cutaway portion of an additional embodiment of a mounting mechanism employing a swivel ball and further employing an intermediate ring component;

FIG. 15 is a side elevation, cross-sectional view of an alternate embodiment of the mounting mechanism of FIG. 14;

FIG. 16 is a perspective view of an intermediate ring component for use in the mounting mechanism of FIG. 15;

FIG. 17 is a side elevation, cross-sectional view of a further embodiment of a mounting mechanism that employs a swivel ball, and also employing a nut to lock the mounting mechanism into place with respect to a panel-type supporting structure;

DETAILED DESCRIPTION OF THE PREFERRED EMBODIMENT

Figure 5A:
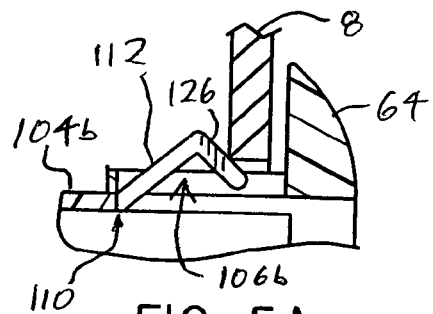
FIGS. 5A-5B, 6A-6B and 7A-7B show varying types of appendages that can be employed on the sleeve components of FIGS. 4A and 4B, both in more extended and less extended positions.

Referring to FIG. 1, a sensing device 2 is shown to be implemented in one exemplary application, namely, a conveyor system 4 as is often found in manufacturing and other commercial facilities implemented in assembly lines or the like. The sensing device 2 in the present embodiment is a light sensing device capable of receiving and detecting the presence of a light beam (e.g., a laser beam) emitted by a light source 6 located on the opposite side of the conveyor system 4. As shown, the sensing device 2 in particular is mounted onto a supporting structure 8 of the conveyor system 4 by way of a mounting mechanism 10.

Exemplary applications for the light sensing device arrangement of FIG. 1 can include, for example, "transmitted beam" or "through beam" applications. However, other applications, including but not limited to "retroreflective" and "diffuse" applications, are known and considered to be within the scope of present invention. In the context of a retroreflective application, for example, the sensing device 2 would both emit and detect light that was reflected off of a target reflector that can be positioned where the light source 6 is located. Similarly, in the context of a diffuse application, the sensing device 2 would both emit and detect light that was reflected off of the object to be sensed (i.e., without the use of a light source positioned where the light source 6 is shown to be located).

Although the mounting mechanism 10 (as well as the supporting structure 8 and the sensing device 2) can have a variety of different structural forms and shapes depending upon the embodiment, FIG. 1 shows the mounting mechanism 10 to have a generally mushroom-shaped exterior including a generally cylindrical stem portion 12 and a generally circular flange 14 extending outward from the stem portion at a first end 16 of the stem portion. In the embodiment shown, the mounting mechanism 10 is positioned onto the supporting structure 8, which is a panel (or other substantially flat flange or wall of low to moderate thickness), by inserting a second end 18 of the stem portion 12 through a complementary orifice within the supporting structure 8. When fully attached to the supporting structure 8, the flange 14 abuts the supporting structure 8. As will be described in further detail in relation to others of the FIGS., the mounting mechanism 10 with the flange 14 can be secured in relation to the supporting structure 8 in a variety of ways.

Although in the present embodiment the mounting mechanism 10 and sensing device 2 are arranged such that the sensing device receives signals entering at the first end 16 of the stem portion 12 where the flange 14 abuts the supporting structure 8, in alternate embodiments the mounting mechanism and sensing device could be arranged in an opposite manner relative to the panel-type supporting structure, e.g., where signals entered at the second end 18 of the stem portion located away from the supporting structure. Further, while in the present embodiment the flange 14 is circular, the flange could also be of a rectangular shape or other arbitrary shape. Additionally, while in the present embodiment the mounting mechanism 10 employs the cylindrical stem portion 12, in alternate embodiments the mounting mechanism could have another tubular shape or, indeed, an outer surface of arbitrary shape (e.g., the mounting mechanism could have a box-shaped outer surface). Also, depending upon the embodiment, the flange 24 could be located at a different location (i.e., other than that currently shown), such as midway along the length of the cylindrical stem portion 12. Further, although the present embodiment envisions that the mounting mechanism 10 would be fully secured to (e.g., fixed in relation to) the supporting structure 8, the present invention is also intended to encompass embodiments that could allow for some relative (e.g., sliding or rotational) motion between the mounting mechanism and the supporting structure.

Although the sensing device 2 of FIG. 1 is a light sensing device, it should be understood that embodiments of the present invention are intended to be applicable with respect to numerous different types of sensing devices including, for example, other light-sensing devices (e.g., color-sensing devices, etc.), devices for sensing various other types of radiation (e.g., infrared, microwave, x-ray, etc.), position-sensing devices, acoustic sensors, vibration sensors, motion sensors such as accelerometers, orientation sensors involving gyroscopes, and numerous other types of sensing devices. Also, while FIG. 1 shows the sensing device 2 to be implemented in connection with the conveyor system 4, it should be understood that embodiments of the present invention are intended to be applicable with respect to the mounting of a variety of different types of sensing devices onto a variety of different supporting structures in a variety of different industrial, commercial, military, residential and other environments and in connection with a variety of different applications.

The mounting mechanism 10 shown in FIG. 1 can take a variety of more specific forms, as described in greater detail with respect to FIGS. 2-20. Referring to FIG. 2, a first such embodiment of mounting mechanism 20 is shown to be mounted on the panel-type supporting structure 8. Like the mounting mechanism 10 of FIG. 1, the mounting mechanism 20 has an exterior that is largely mushroom-shaped, having a generally cylindrical stem portion 22 and a generally circular flange 24. More specifically, however, the mounting mechanism 20 includes three components. First, the mounting mechanism 20 includes a housing 26 that includes both the circular flange 24 as well as a cylindrical stem portion 28. Additionally, the mounting mechanism 20 includes a cylindrical sleeve 30 (which also can be considered a second housing portion) that is configured to fit concentrically around an exterior surface 32 of the cylindrical stem portion 28 of the housing 26. The sleeve 30 extends most of the length of the cylindrical stem portion 28 of the housing 26 and, at a first end 34, includes a lip 36 that is configured to abut a first side 38 of the panel-type supporting structure 8 when the mounting mechanism 20 is assembled thereto. The sleeve 30 (as well as, in some embodiments, the housing 26) can in at least some embodiments be made of a flexible plastic material or some other flexible material such as aluminum.

A second end 40 of the sleeve 30 is shown to be in contact with a third component of the mounting mechanism 20, namely, a nut 42. During attachment of the mounting mechanism 20 to the supporting structure 8, the housing 26 is pushed into the channel, and the sleeve 30 is slid over the back portion of the housing. Then, the nut 42 is screwed onto threads 44 (e.g., fine pitch threads) existing along the exterior surface of the cylindrical stem portion 28 at a first end 48 of the housing 26 that is opposite a second end 46 of the housing (at which is located the circular flange 24), in order to tighten or clamp the assembly against the panel-shaped supporting structure 8. That is, once the nut 42 is sufficiently rotated onto the cylindrical stem portion 28 of the housing 26, the nut 42 abuts the sleeve 30 at the second end 40 tending to cause the sleeve to move towards and eventually abut the first side 38 of the panel-type supporting structure 8. The relative movement of the nut 42 and the sleeve 30 in relation to the housing 26 tends to pull a rim 50 of the circular flange 24 into contact with a second side 52 of the supporting structure 8. Once the nut 42 is sufficiently tightened, the mounting mechanism 20 is held in place and mounted upon the supporting structure 8 due to the opposing forces applied upon the first and second sides 38, 52 of the panel-type supporting structure that are applied by the lip 34 of the sleeve 30 and the rim 50 of the circular flange 24.

Although not shown, it is to be understood that typically, when mounted in the manner shown in FIG. 2, the mounting mechanism 20 would support, within a cylindrical interior portion 54 of the housing 26 the sensing device 2 or other sensing device. In the embodiment shown, the cylindrical interior portion 54 includes a first orifice 56 at the first end 48 of the housing 26 that has the same diameter as the rest of the cylindrical interior portion 54. However, at the second end 46 of the housing 26, proximate the circular flange 24, there is provided an additional orifice 58 to the cylindrical interior portion 54. Because in the present embodiment the cylindrical interior portion 54 has a diameter that is greater than that of the additional orifice 58, a sensing device slid in through the orifice 56 cannot be pushed all of the way through the housing 26 but rather is stopped upon reaching the opening 58 (such that the sensing device cannot be pushed past the flange 24).

As noted above, the additional orifice 58 located at the second end 46 of the housing 26 typically is the opening through which a signal (e.g., a light signal) to be received by a sensing device supported by the housing would pass, that is, the additional orifice is at the "front" of the mounting mechanism. However, in alternate embodiments the first orifice 56 at the first end 48 of the housing could be the "front" of the mounting mechanism 20 at which signals are received. Indeed, due to the presence of the orifice 58 as well as the presence of the orifice 56, the present mounting mechanism 20 is capable of employing a sensing device that is intended to receive signals coming towards either or both of the ends 48 and 46 of the housing 26. Additionally, in further alternate embodiments, signals to be received by the sensing device could be received at any of a variety of different locations other than (or in combination with) one or both of the orifices 56, 58. Also, in some alternate embodiments, no orifices are necessary to sense quantities or to receive signals (e.g., vibrations).

Turning to FIG. 3, a further embodiment of mounting mechanism 60 is shown that also has a generally mushroom-shaped exterior surface with a cylindrical stem portion 62 and a circular flange 64. Although the mounting mechanism 60 (like the mounting mechanism 20) includes three parts, namely, a housing 66 with a cylindrical portion 68 and the flange 64, a sleeve 70, and a threaded portion 72 that engages threads 74 on the cylindrical portion 68 of the housing 66, the mounting mechanism 60 differs from the mounting mechanism 20 in certain respects. First, while the housing 66 includes an orifice 65 corresponding to the orifice 58 of the mounting mechanism 20, the mounting mechanism 60 lacks any orifice corresponding to the orifice 56 of the mounting mechanism 20 (albeit such an orifice could be provided in alternate embodiments). Further, and more significantly, the mounting mechanism 60 generally has a design that is inverted in comparison with the design of the mounting mechanism 20.

In particular, the sleeve 70, rather than surrounding the exterior of the housing 66, instead along most of its length is configured to fit within a cylindrical interior 76 of the housing 66. The threaded portion 72 is not a nut but rather is a screw portion that interfaces the threads 74 of the housing 66, which are interiorly-facing threads. As the threaded portion 72 is rotated with respect to the threads 74 in a manner causing the threaded portion to proceed farther into the housing 66, the threaded portion abuts a first end 78 of the sleeve 70, which causes tabs 80 of the sleeve 70 to come into contact with the first side 38 of the panel-type supporting structure 8. The rotation of the threaded portion 72 further tends to pull the housing 66 in relation to the sleeve 70 such that a rim 82 of the flange 64 comes into contact with the second side 52 of the supporting structure 8. Thus, upon appropriate tightening of the threaded portion 72, the mounting mechanism 60 is mounted into place with respect to the supporting structure 8 due to the opposing forces applied by the flange 64 and the tabs 80.

Referring additionally to FIGS. 4A and 4C, the sleeve 70 and housing 66 of the mounting mechanism 60 are shown in more detail. FIG. 4A in particular shows the sleeve 70 to have a largely cylindrical exterior surface 84 as well as a largely cylindrical interior surface 86, within which can be positioned a sensing device. Although largely cylindrical (or annular), at its first end 78 the sleeve 70 includes alternating fingers 88 and slots 90, which allow for the sleeve 70 to be more easily fit into the housing 66. The slots 90 also can provide clearance for springs, set screws, extensions/supports extending inwardly from the housing 66, and other components that can be employed in certain embodiments (including some embodiments discussed below with respect to others of the FIGS.). In at least some embodiments, the slots 90 can be reversed chamfered so that the ends (e.g., the ends of the housing and sleeve) slide over each other easily.

Further as shown in FIG. 4A, each of the tabs 80 of the sleeve 70 in the present embodiment include three segments, namely, a first, axially-extending segment 92 extending axially away from the main body of the sleeve 70, a second, radially-outwardly extending segment 94 extending outward from the respective first axially-extending segment, and a third, axially-extending tip portion 96 extending axially away from the end of the respective radially-outwardly extending segment (again generally away from the main body of the sleeve 70). It is the tip portions 96 that encounter the first side 38 of the supporting structure 8 when the mounting mechanism 60 is mounted thereto.

The tabs 80 in this embodiment take this form for several reasons. To begin with, the radially-outwardly extending segments 94 of the tabs 80 are required in order to allow the tabs to extend radially outward past the cylindrical portion 68 of the housing 66 such that the tips 96 of the tabs 80 can interface the supporting structure 8, which otherwise does not extend inwardly past the housing toward the general radial vicinity of the main body of the sleeve 70. As shown in FIG. 4C, the housing 66 includes several orifices 98 alternating with various struts 100 that link a main portion 102 of the cylindrical portion 68 of the housing 66 to the flange 64. It is through the orifices 98 that the tabs 80 protrude radially-outwardly when the sleeve 70 is positioned within the housing 66. In addition to allowing the tips 96 of the tabs 80 to be positioned radially-outwardly of the housing 66, the shape of the tabs 80, which is generally in the shape of a letter Z as viewed cross-sectionally, allows the tabs to have some spring-like characteristics.

In alternate embodiments, the tabs 80 could take different forms. For example, as shown in FIG. 4D, an alternate embodiment of the tabs shown as tabs 80a could include ramped segments 81. Such ramped segments 81 would tend to have contact surfaces 83 relative to the panel-type supporting structure 8 that were larger than that provided by merely the tips 96 shown in FIGS. 3 and 4A. Also, in some alternate embodiments, the tips 96 of the tabs 80 of FIG. 4A could extend axially in the opposite direction relative to the radially-outwardly extending segments 94, such that the tabs had an overall C-shaped cross section.

FIG. 4B in particular illustrates an alternate embodiment of a sleeve 104 having both an alternate type of tabs 106 as well as a somewhat different form of cylindrical main body 108 in comparison with the corresponding features of the sleeve 70. In particular, the tabs 106 of the sleeve 104 are more numerous than the tabs of the sleeve 70, but are narrower in width. Further, the tabs 106, rather than having three segments, instead only have first, axially-extending segments 110 and radially-outwardly extending segments 112 (e.g., the tabs lack any axially-extending tips). Further, although more numerous than the tabs 80 of the sleeve 70, the tabs 106 are grouped into clusters 114 such that all of the tabs of a given cluster fit through a respective one of the orifices 98 of the housing 66 (shown in FIG. 4C).

Also, while the sleeve 104 like the sleeve 70 includes alternating fingers 116 and slots 118 (corresponding to the alternating fingers 88 and slots 90 of the sleeve 70) located proximate a first end 120, the sleeve 104 differs from the sleeve 70 insofar as the sleeve 104 additionally has a single, axially-extending slot 122 that extends the entire length of the sleeve 104 such that neither the main body 108 of the sleeve nor any other portion of the sleeve is a complete cylinder. That is, no portion of the sleeve 104 extends all the way around. The existence of the slot 122 allows the entire sleeve 104 to be compressed slightly as it is inserted into the housing 66, thereby allowing for easier insertion of the sleeve with respect to the housing. Although FIG. 4A does not show the sleeve 70 as including a slot corresponding to the slot 122 of FIG. 4B, it should be understood that the sleeve 70 of FIG. 4A likewise could include such a slot.

Figure 5B:
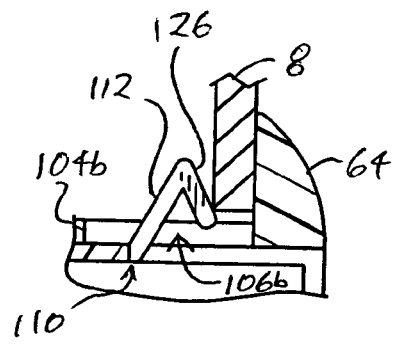
Figure 6A:
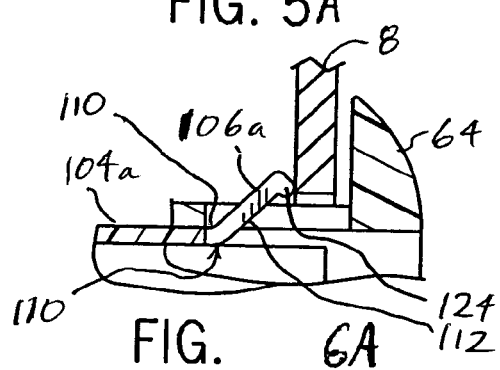
Figure 6B:
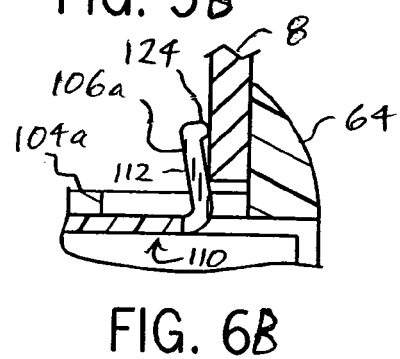

Tabs such as those shown in FIG. 4B can take a variety of forms depending upon the embodiment, as shown more clearly in FIGS. 5A, 5B, 6A, 6B, 7A and 7B, which show three different configurations of tabs in cross section. FIG. 7A and 7B again show the tabs 106 on the sleeve 104 of FIG. 4B. However, FIGS. 6A and 6B show a modified version of the sleeve 104 referenced by numeral 104a in which each of the tabs, now identified by reference numeral 106a, includes a small bump 124 along its side that would tend to interface the supporting structure 8. The bumps 124 serve to provide a springing effect when the tabs 106a are in contact with the supporting structure 8. Further, FIGS. 5A and 5B show still another embodiment of the sleeve 104, referenced by numeral 104b, having tabs 106b that each include an axially-extending segment 110, a further radially-outwardly extending segment 112, and additionally a further radially-inwardly extending segment 126. The radially-outwardly extending segment 112 and radially-inwardly extending segment 126 of each of the tabs 106b, as shown in FIGS. 5A and 5B, generally form an inverted V-shaped structure that provides additional springing action when the sleeve 104b is tightened against the supporting structure 8.

Figure 7A:
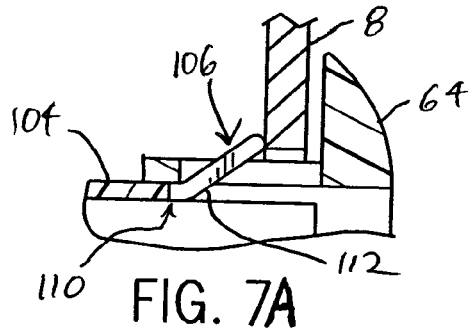
Figure 7B:
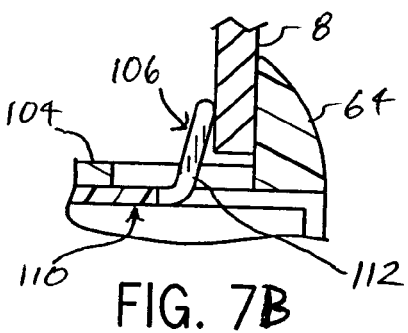

FIGS. 5A-7B not only show the various forms of tabs 106, 106a and 106b, but also show those tabs in each of two operational circumstances. FIGS. 5A, 6A and 7A show the respective tabs 106/106a/106b in a first circumstance in which the tabs are in an extended position that would exist when the sleeve 104/104a/104b and its tabs are not in contact with, or are barely in contact with, the panel-type supporting structure 8. FIGS. 5B, 6B and 7B show the respective tabs 106/106a/106b in a second circumstance in which the tabs are in a compressed position that would exist when the sleeve 104/104a/104b has been pushed up against the supporting structure 8 (e.g., due to the rotation of the threaded portion 72 in relation to the housing 66). In each of the embodiments of FIGS. 5A-7B, (as well as that of FIG. 4B), the use of the respective tabs 106/106a/106b allows for the overall mounting mechanism employing the housing 66 and the sleeves 104/104a/104b to be mounted to the supporting structure 8 in a manner that is more gradual and involves the use of spring forces to a greater degree than did the embodiment of FIG. 4A employing the sleeve 70 and tabs 80. That is, the securing of the sleeve 104/104a/104b and housing 66 with respect to the supporting structure 8 is facilitated at least in part by the springing action afforded by the tabs 106/106a/106b of FIGS. 4B and 5A-7B, as the tabs bend upward and get pinched while the threaded portion 72 is tightened down.

Although the mounting mechanism 20 of FIG. 2 employing the sleeve 30 that is entirely external to the housing 26 is not shown to employ any of the tabs discussed with reference to FIGS. 3-7B, it should be understood that in alternate embodiments the sleeve 30 and in particular the lip 34 could be modified to employ tabs or similar appendages or extensions as discussed with reference to FIGS. 3-7B.

Turning to FIGS. 8-18, additional embodiments of mounting mechanisms are shown in which the mounting mechanisms are generally mushroom-shaped in their exterior appearance, with a housing, a sleeve, and a threaded portion/screw that mates with interior threads of the housing, similar to the mounting mechanism 60 of FIG. 3. Additionally, in contrast to the embodiment of FIG. 3, the mounting mechanisms of FIGS. 8-18 also include a swivel ball feature. In each case, the swivel ball is configured to support a sensing device therewithin, and the swivel ball is supported within the housing. Tightening of one or more screws (or other threaded component(s)) with respect to the housing allows the swivel ball to be locked in a particular position among many possible positions. Consequently, the sensing device supported by the swivel ball in each case also can take on and be set to a variety of different rotational orientations. The swivel ball can have integral mounting features for mounting the sensing device therewithin including, for example, threads, snaps, dovetails, fasteners, adhesives, etc. In alternate embodiments, the swivel ball and sensing device can be implemented as one part, that is, the sensing device can be implemented as part of the swivel ball.

Figure 8:
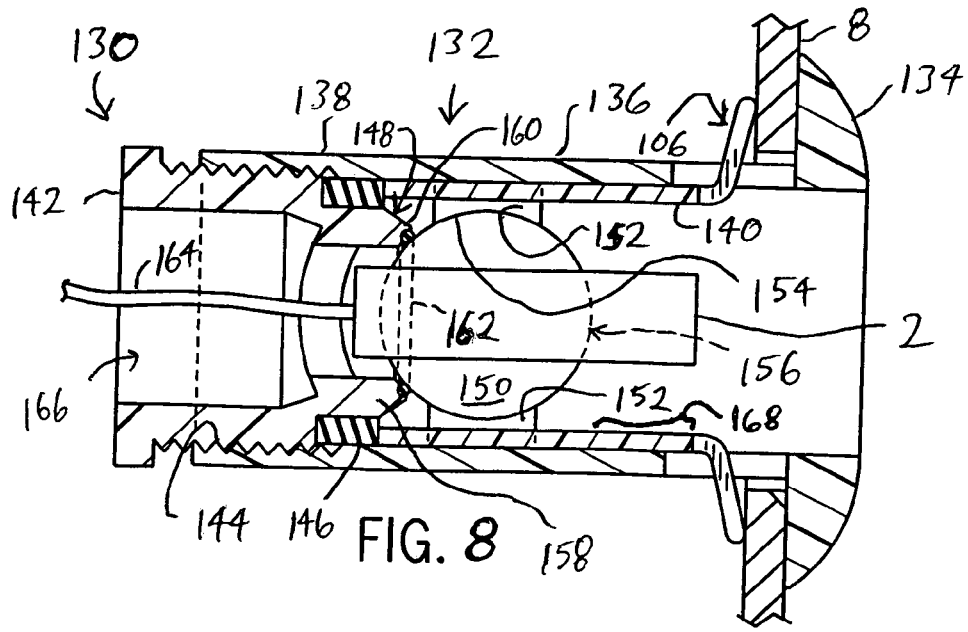
FIG. 8 is a side elevation, cross-sectional view of another exemplary embodiment of a mounting mechanism that is being utilized to mount a sensing device onto a panel-type supporting structure, where the mounting mechanism further includes a swivel ball.

Referring particularly to FIG. 8, one such embodiment of mounting mechanism 130 includes a generally cylindrical stem portion 132 and a generally circular flange 134. More particularly, the mounting mechanism 130 includes a housing 136 that includes both the flange 134 and a cylindrical portion 138. The mounting mechanism 130 additionally includes a sleeve 140 that (like the sleeve of FIG. 3) is mostly positioned within the housing 136. As shown, the sleeve 140 includes, in this case, the tabs 106 shown in FIG. 4B, although in alternate embodiments other types of tabs or other structures could also be employed. Further, the mounting mechanism 130 employs an externally-threaded screw portion 142 that interfaces interior threads 144 of the cylindrical portion 138 of the housing 136.

In the present embodiment, in contrast to the embodiment described with reference to FIG. 3, the screw portion 142 also includes a rubber ring 146 extending along the outer perimeter of the screw portion at its front (innermost) end 148. The rubber ring 146 forms the interface between the screw portion 142 and the sleeve 140. The rubber ring (which also can be made of foam) allows for the taking up of varying tolerances when the mounting mechanism 130 is mounted to panel-type supporting structures of varying thicknesses. That is, through the use of the rubber ring, the mounting mechanism 130 can more easily be mounted to a variety of different supporting structures (e.g., not just the supporting structure 8 of FIG. 8) having varied thicknesses.

As mentioned earlier, the mounting mechanism 130 also includes a swivel ball 150 that rides within two or more supports or feet 152 extending inwardly from the housing 136. In the present embodiment, the swivel ball 150 is not perfectly spherical but rather includes a cylindrical channel 156 within which can be supported the sensing device 2 or some other sensing device. Further as shown, the feet 152 have inner interfacing surfaces 154 that support the swivel ball 150 in a manner that, in the absence of further restraint, allows for free (or largely free) rotation of the swivel ball 150 with respect to the feet 152. As indicated by dashed lines shown in FIG. 8, it is envisioned that the two or more feet 152 protrude inward from the housing 136 through the sleeve 140. To allow for the passage of the feet 152, the sleeve 140, while mostly or entirely cylindrical along a first region 168 of its length, has slots such as the slots 90, 118 described above within the region between the first region 168 and the ends of the sleeve that interface the rubber ring 146. In alternate embodiments, the housing and sleeve could take other forms. For example, one or more feet 152 could extend inward from the housing past the sleeve and then, within the sleeve, form a continuous or largely continuous support ring around the entire swivel ball. In such embodiments, one or more fingers of the sleeve similar to the fingers 88, 116 described above would extend through arc-shaped slots within the housing situated between the support ring interfacing the swivel ball and the portion of the housing external to the sleeve.

Further in accordance with the present embodiment, the screw portion 142 in addition to having the rubber ring 146 also includes an inwardly protruding annular portion 158, located radially-inwardly of the rubber ring 146. At an end portion 160 of the annular portion 158 is located a gasket or o-ring 162. The screw portion 142 is configured so that, as it is rotated to move inwardly into the housing 136 such that the housing 136 moves with respect to the sleeve 140, the o-ring 162 moves toward the swivel ball 150. Further, as the mounting mechanism 130 is affixed to the supporting structure 8 due to the opposing pressures applied by the tabs 106 of the sleeve 140 and the circular flange 134 of the housing 136, the o-ring 162 comes into contact with the swivel ball 150 and the swivel ball then becomes set or locked into place relative to the remainder of the mounting mechanism due to the pressure applied by the o-ring 162.

In the embodiment shown, the sensing device 2 can be orientated during attachment of the mounting mechanism 130 onto the supporting structure 8 as follows. As shown in FIG. 8, the sensing device 2 has a wire or cable 164 extending from the sensing device out through the screw portion 142, which has a hollow interior 166. Once the sensing device 2 is placed onto (e.g., within) the swivel ball 150, and the screw portion 142 is rotated inwardly with respect to the housing 136 sufficiently far that a slight amount of pressure is applied by the o-ring 162 upon the swivel ball (or even prior to such contact between the o-ring and the swivel ball), a person installing the sensing device can orient the swivel ball and the sensing device by appropriately moving the wire 164. Then, once the swivel ball 150 and the sensing device 2 are in the desired position, the screw portion 142 is further tightened to fully set or lock the swivel ball in place and also to complete the tightening of the mounting mechanism to the supporting structure 8.

Figure 9:
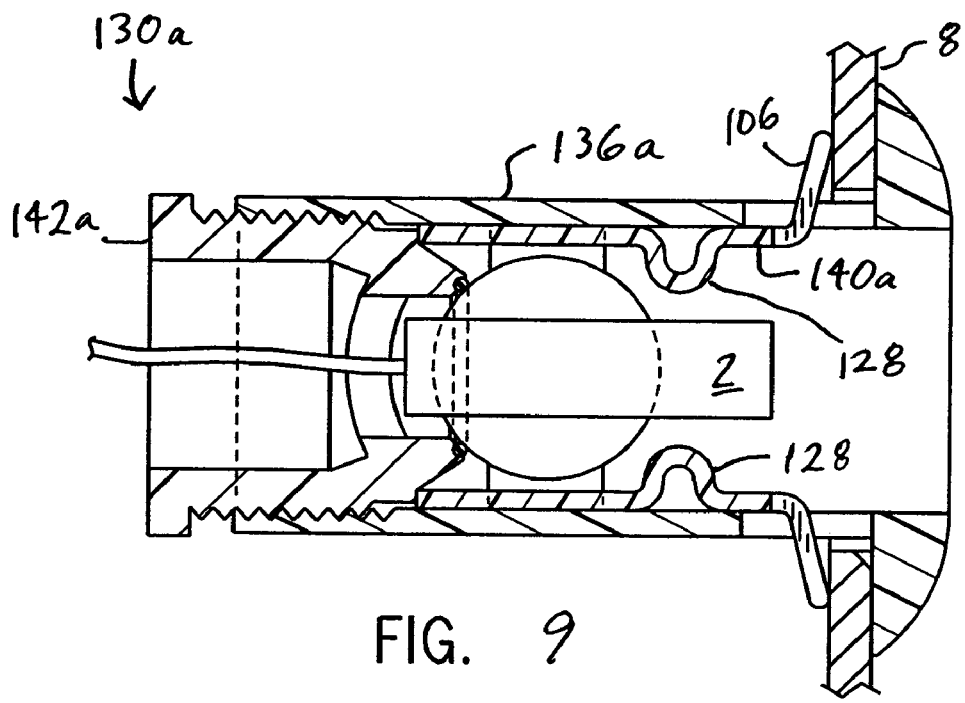
FIG. 9 is a side elevation, cross-sectional view of an alternate embodiment of the mounting mechanism of FIG. 8 employing the swivel ball.

Turning to FIG. 9, a modified version of the mounting mechanism 130, shown as a mounting mechanism 130a, employs a housing 136a, a screw portion 142a, and a sleeve 140a that are all similar to the corresponding components of the mounting mechanism 130 except insofar as, rather than employing the rubber ring 146 to interface the sleeve, the screw portion 142a lacks any such rubber ring and the sleeve 140a instead includes an inwardly protruding undulation or "crumple zone" 128. The crumple zone 128 is capable of bending when placed under pressure. Consequently, the crumple zone 128 cooperates with the tabs 106 (or other tabs as described above) such that, when the screw portion 142a is tightened with respect to the housing 136a, the sleeve 140a is tightened against the supporting structure 8 and, additionally, any variation in tolerances due to variations in the possible width of the supporting structure 8 are taken up.

Figure 10:
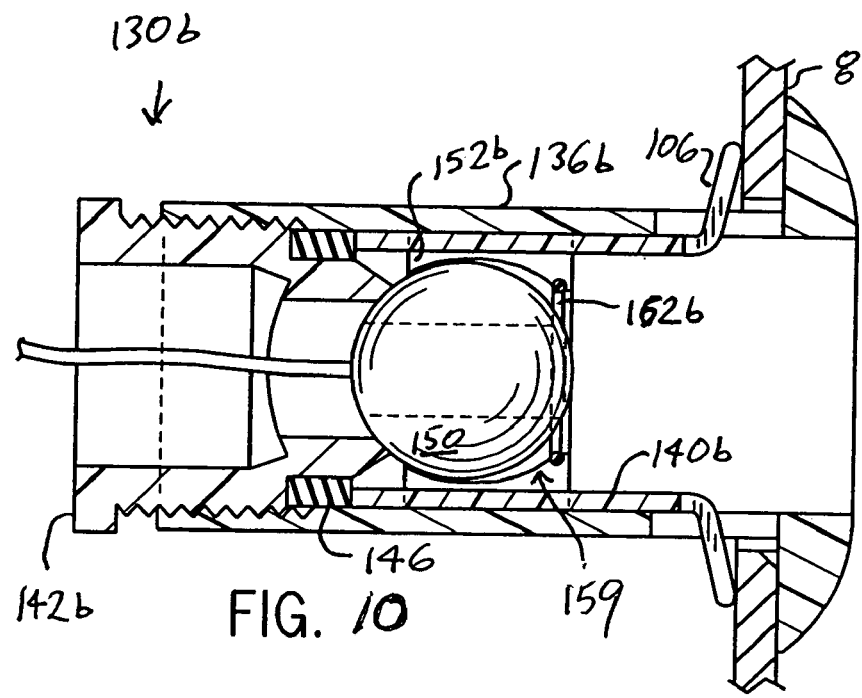
FIG. 10 is a side elevation, cross-sectional view of another exemplary embodiment of a mounting mechanism that is being utilized to mount a sensing device onto a panel-type supporting structure and that employs a swivel ball, where a sleeve component is internal to a housing component.

Turning to FIG. 10, a further alternate embodiment of the mounting mechanism 130, shown as a mounting mechanism 130b, again includes a housing 136b, a sleeve 140b, and a screw portion 142b. As in the case of the mounting mechanism 130, the screw portion 142b of the mounting mechanism 130b includes the rubber ring 146 around the perimeter of its end. Additionally, the sleeve 140b of the mounting mechanism 130b is largely the same as that of the mounting mechanism 130 (both include the tabs 106 and do not have any crumple zone). In contrast to the mounting mechanism 130, however, the mounting mechanism 130b has two or more feet 152b that differ from the feet 152 shown in FIG. 8 insofar as, on the sides of the feet that are farthest away from the screw portion 142b, the feet extend radially inward to a larger degree than do the feet 152. Also, in contrast to at least some embodiments of the mounting feet 152, the mounting feet 152b become entirely connected with one another so as to form a support ring 159 for the swivel ball 150.

Further as shown, mounted on the support ring 159 is a gasket or o-ring 162b. Thus, in contrast to the embodiment of FIG. 8 in which the o-ring 162 is mounted on the screw portion 142, the mounting mechanism 130b employs the o-ring 162b that is mounted on the support ring 159, which is a part of the housing 136b. Consequently, the mounting mechanism 130 operates in a somewhat different manner than the mounting mechanism 130 in terms of its setting of the position of the swivel ball 150. In particular, instead of the swivel ball 150 being set or locked into place due to contact with the screw portion 142 and an o-ring mounted thereupon, the swivel ball rather is thrust axially toward the supporting structure 8 upon being in contact with the screw portion 142b and, as this is occurring, the swivel ball is thrust forward so as to contact the o-ring 162b and become set in place.

Figure 11:
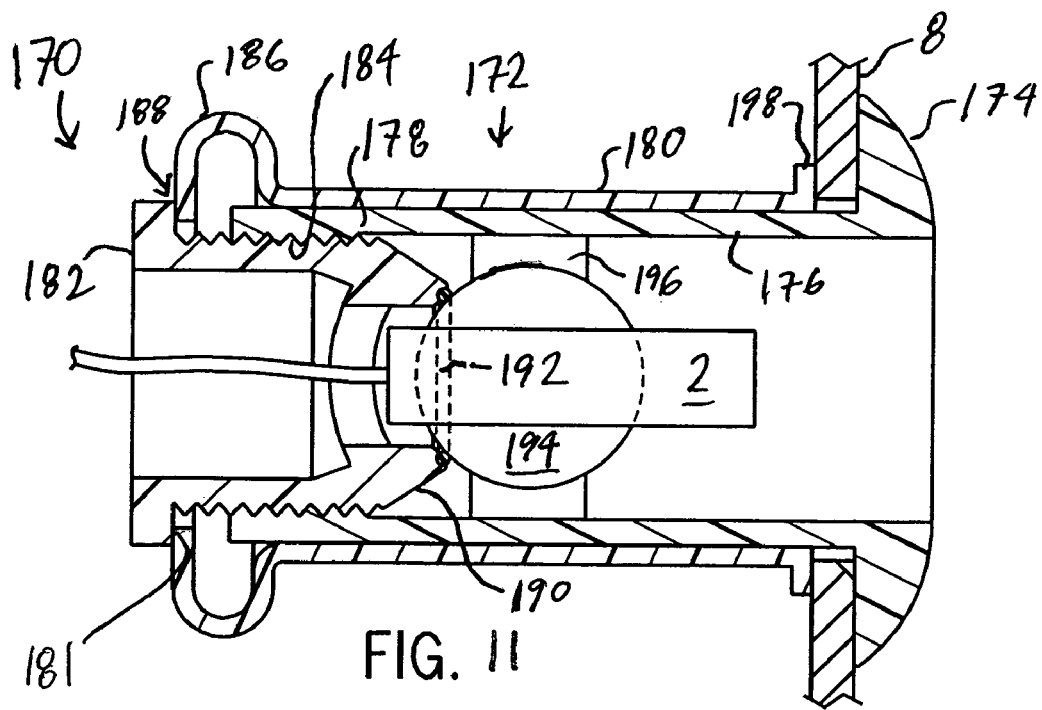
FIG. 11 is a side elevation, cross-sectional view of an alternate embodiment of the mounting mechanism of FIG. 10 employing the swivel ball.

Turning to FIG. 11, a further embodiment of a mounting mechanism 170 is shown. Similar to the previous embodiments described with reference to FIGS. 8-10, the mounting mechanism 170 has a generally mushroom-shaped exterior surface including a cylindrical stem portion 172 and a mushroom-type circular flange 174. Further, the mounting mechanism 170 includes both a housing 176 that includes the flange 174 and a cylindrical portion 178, a sleeve 180, and an externally threaded screw portion 182 configured to interface internal threads 184 of the housing 176. Also, as with the mounting mechanisms 130, 130a of FIGS. 8-9, the screw portion 182 of the mounting mechanism 170 includes an o-ring 192 mounted at an innermost end 190 of the screw portion. Additionally, the mounting mechanism 170 includes a swivel ball 194 mounted on a support footing 196 corresponding to the mounting feet described above.

In contrast to the mounting mechanisms 130,130a of FIGS. 8-9, however, the sleeve 180 of the mounting mechanism 170 is mounted around the exterior of the housing 176 rather than within the housing (as was the case with the mounting mechanism 20 of FIG. 2). Also, rather than employing tabs such as the tabs 106 described with reference to FIG. 10, the sleeve 180 interfaces the supporting structure 8 by way of a lip 198 of the sleeve, similar to the lip 34 described with reference to the mounting mechanism 20 of FIG. 2. Further, the sleeve 180 includes a crumple zone 186 proximate to an end 188 at which the sleeve 180 interfaces an outer rim 181 of the screw portion 182. The crumple zone 186 of the sleeve 180 is in some embodiments circular in cross section or, alternatively, is formed from multiple fingers, each of which forms a respective crumple zone portion. Due to the existence of the crumple zone 186, when the screw portion 182 is rotated with respect to the threads 184 of the housing 176, the sleeve 180 moves with respect to the housing 176 such that the lip 198 and the flange 174 provide opposing forces with respect to (e.g., clamp around) the supporting structure 8. The crumple zone 186 bends or "crumples" to the extent necessary to take up tolerances that may vary depending upon the particular supporting structure on which the mounting mechanism 170 is being mounted.

Figure 12:
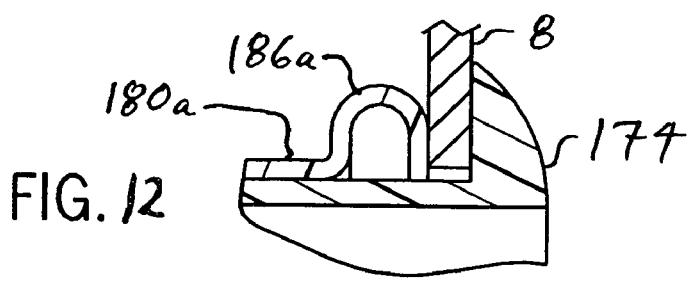
FIG. 12 is a side elevation, cross-sectional view of a cutaway portion of a further alternate embodiment of the mounting mechanism of FIG. 11.

As in the case of the mounting mechanisms 130,130a of FIGS. 8-9, when the screw portion 182 is rotated, the o-ring 192 locks the swivel ball 194 in place so as to set the rotational orientation of the sensing device 2. As should be evident from FIG. 11 (as well as FIGS. 8-10), the sensing device 2 can be varied in terms of its translational position relative to the swivel ball as well varied in terms of its rotational position due to movement of the swivel ball. It should further be noted that, while FIG. 11 shows the crumple zone 186 to be proximate the ends of the sleeve 180, the crumple zone actually could be situated at a variety of locations along the sleeve. FIG. 12, for example, shows an alternate embodiment in which the sleeve, now referenced as a sleeve 180a, includes a crumple zone 186b at the location where the sleeve interfaces the supporting structure 8, in place of the lip 198.

Figure 13:
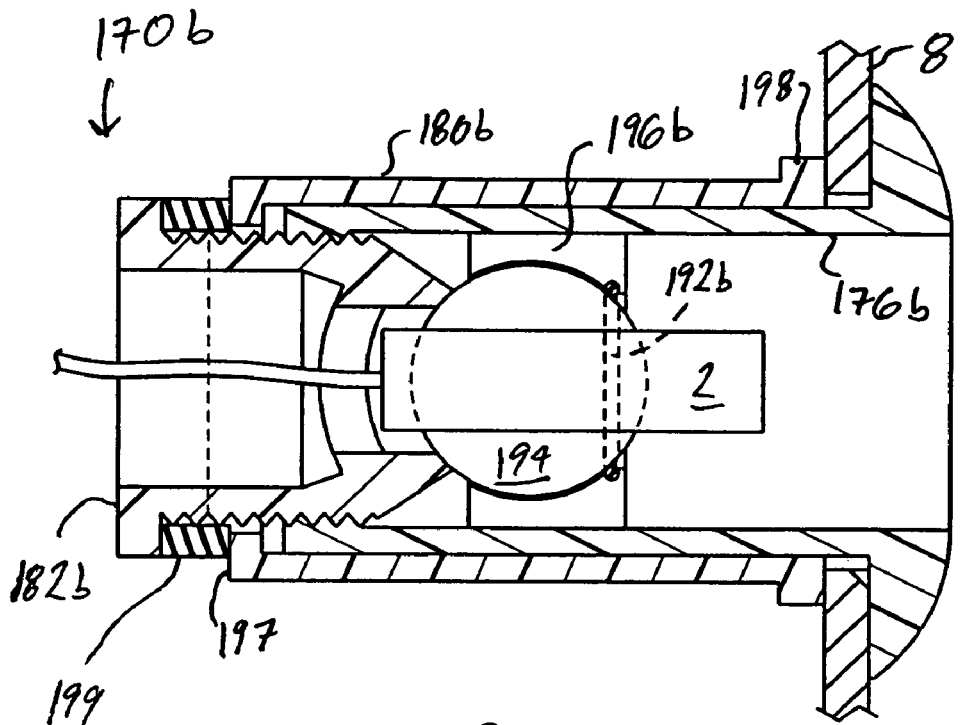
FIG. 13 is a side elevation, cross-sectional view of an alternate embodiment of the mounting mechanism of FIG. 11.

FIG. 13 shows a further modified embodiment of the mounting mechanism 170 of FIG. 11, referred to as a mounting mechanism 170b. As shown, the mounting mechanism 170b includes a housing 176b that is the same as the housing 176 of FIG. 11 except insofar as the housing employs a mounting support 196b for the swivel ball 194 that is similar to the mounting feet 152b of FIG. 10. In particular, as in FIG. 10, FIG. 13 shows the mounting support 196 to extend radially inward farther on a side opposite the side that interfaces a screw portion 182b than it does on the side that is interfaced by the screw portion. Further, as in FIG. 10, FIG. 13 shows an o-ring 192b to be positioned on the mounting support 196b rather than on the screw portion 182b. Further, while the mounting mechanism 170b employs a sleeve 180b that (as in the cases of FIGS. 11 and 12) is situated entirely exteriorally of the housing 176b, and which employs the lip 198 to interface the supporting structure 8, the sleeve 180b lacks any crumple zone. Rather, the screw portion 182b includes a rubber ring 199 that extends around its outer periphery and is situated radially outward from (or even supported upon some of) the external threads of the screw portion, and the sleeve 180b includes an additional lip 197 that interfaces the rubber ring 199.

Consequently, as in the other embodiments discussed with reference to FIGS. 8-12, inward rotation of the screw portion 182b in relation to the housing 176b causes the sleeve 180b to move relative to the housing 176b so as to clamp the mounting mechanism 170b to the supporting structure 8. The rotation of the screw portion 182 further causes the swivel ball 194 to become locked in place, since the swivel ball is thrust axially toward the o-ring 192b. Additionally, the existence of the rubber ring 199 between the screw portion 182b and the lip 197 of the sleeve 180b allows for the mounting mechanism to adapt to variations in the tolerances of the particular supporting structure.

Turning to FIGS. 14-16, in certain further embodiments of mounting mechanisms, an intermediate component (or possible more than one intermediate component) is situated between the screw portion and the swivel ball. More specifically, as shown in FIG. 14, a portion of an exemplary mounting mechanism 200 is shown that includes a screw portion 202 and a housing 206. Although not shown, it should be understood that the mounting mechanism 200 also is intended to include, when mounted to a supporting structure such as the supporting structure 8, an interior or exterior sleeve as described in the embodiments shown and discussed above with reference to FIGS. 2-13. Further, the portion of the mounting mechanism 200 shown in FIG. 14 includes a swivel ball 210 supported on two or more mounting feet or other mounting support 208 extending radially inwardly (and formed integrally with) the housing 206.

In contrast to the embodiments discussed above with reference to FIGS. 8-13, the portion of the mounting mechanism 200 shown in FIG. 14 includes a ring-shaped intermediate component 204 that is positioned between an innermost edge 212 of the screw portion 202 and the swivel ball 210. Further, the intermediate component 204 is limited in terms of its radial movement insofar as it is situated within a ring-shaped axial protrusion 214 of the innermost edge 212 of the screw portion 202 (that is, the intermediate component 204 is radially trapped within the screw portion). The intermediate component 204 additionally includes a rubber gasket or o-ring 216 along an interfacing end 218 that is intended to interface the swivel ball 210. As described in the previous embodiments, inward rotation of the screw portion 202 into the housing 206 causes the o-ring 216, which in this case is mounted upon the intermediate component 204, to press against the swivel ball 210 so as to lock the swivel ball in place. In contrast to the previous embodiments, because the intermediate component 204 on which the o-ring 216 is supported is separate from the screw portion 202, the inward rotation of the screw portion does not necessarily translate to rotation of the o-ring 216. As a result, it is less likely than in the previous embodiments that inward rotation of the screw portion 202 will cause unintended rotation of the swivel ball 204 as the screw portion is tightened.

Referring additionally to FIGS. 15 and 16, a modified version of the portion of the mounting mechanism 200, referred to by way of reference numeral 200a, employs a screw portion 202a, a ring-shaped intermediate component 204a, and a housing 206a that differ from the corresponding components of FIG. 14 in the following manners. As shown particularly in FIG. 16, the intermediate component 204a includes four keyways 220 extending axially from a first edge 222 that is intended to interface the screw portion 202a toward (but not up to) a second edge 224 on which is mounted an o-ring 226 (see FIG. 15, where the o-ring interfaces the swivel ball 210). Further, the housing 206a, or in particular four mounting feet (or a mounting support) 208a of the housing, include four prongs 228 that extend radially inwardly at an axial location along the housing that corresponds to the positions of the four keyways 220 when the intermediate component 204a is positioned adjacent to the swivel ball 210.

Because the prongs 228 are sufficiently long to extend into the keyways 220 when the intermediate component 204a is present, rotation of the intermediate component is entirely prevented when the screw portion 202a is being rotated inward, and thus unintended rotation of the swivel ball 210 due to rotation of the screw portion 202a is prevented.

Although the intermediate component 204a shown in FIG. 16 has four keyways 220 (and the housing 206a has four prongs 228), in alternate embodiments any number of keyway (and prongs) could be used, ranging from one keyway (prong) to any larger number of keyways (prongs). Also, in certain embodiments, depending upon the tightness of the fit of the prongs 228 in relation to the keyways 220, the prongs 228 can serve to keep the intermediate component 204 generally in place radially and even axially, notwithstanding the removal of the screw portion 202a away from the housing 206a. Further, in certain embodiments, an o-ring or gasket is not necessary on the intermediate component.

Referring to FIG. 17, a further embodiment of a mounting mechanism 230 is shown that includes a screw portion 232, a housing 236 and, instead of a sleeve, further includes an additional nut 234. As with respect to the embodiments shown in FIGS. 8-16, the mounting mechanism 230 also includes a swivel ball 238 that is supported by mounting feet (or a mounting support) 240 extending radially inwardly as part of the housing 236. Further, the externally-threaded screw portion 232 interfaces internal threads 244 of the housing 236. Inward rotation of the screw portion 232 causes a gasket or o-ring 242 supported on an innermost end 243 of the screw portion to press against the swivel ball 238, thereby locking the swivel ball in place.

In contrast to the embodiments of FIGS. 8-16, however, inward rotation of the screw portion 232 does not, in addition to locking the swivel ball 238, cause the mounting mechanism 230 to become attached to the supporting structure 8. Rather, that attachment is accomplished by a separate operation, namely, the rotation of the nut 234 upon external threads 246 of the housing 236, up until the nut 234 abuts the supporting structure 8. Further, as is evident from FIG. 17, the housing 236 includes a hatch or removable door portion 248 situated axially alongside the swivel ball 238, and which has an area dimension equaling or exceeding that of the swivel ball. The swivel ball 238 can be inserted into the housing 236 by opening the removable door portion 248 (which includes at least a portion of the mounting support for the swivel ball). After the swivel ball 238 is inserted, the door portion 248 is closed, such that the mounting feet/support is in contact with the swivel ball and such that the door is appropriately aligned with the rest of the housing 236. The door portion 248 can be fixed in relation to the remainder of the housing 236 in a variety of ways including, for example, the application of adhesives, hinges, screws or by way of a snap fit. In at least some embodiments the door portion 248 does not have threads like the remainder of the housing 236.

Figure 18:
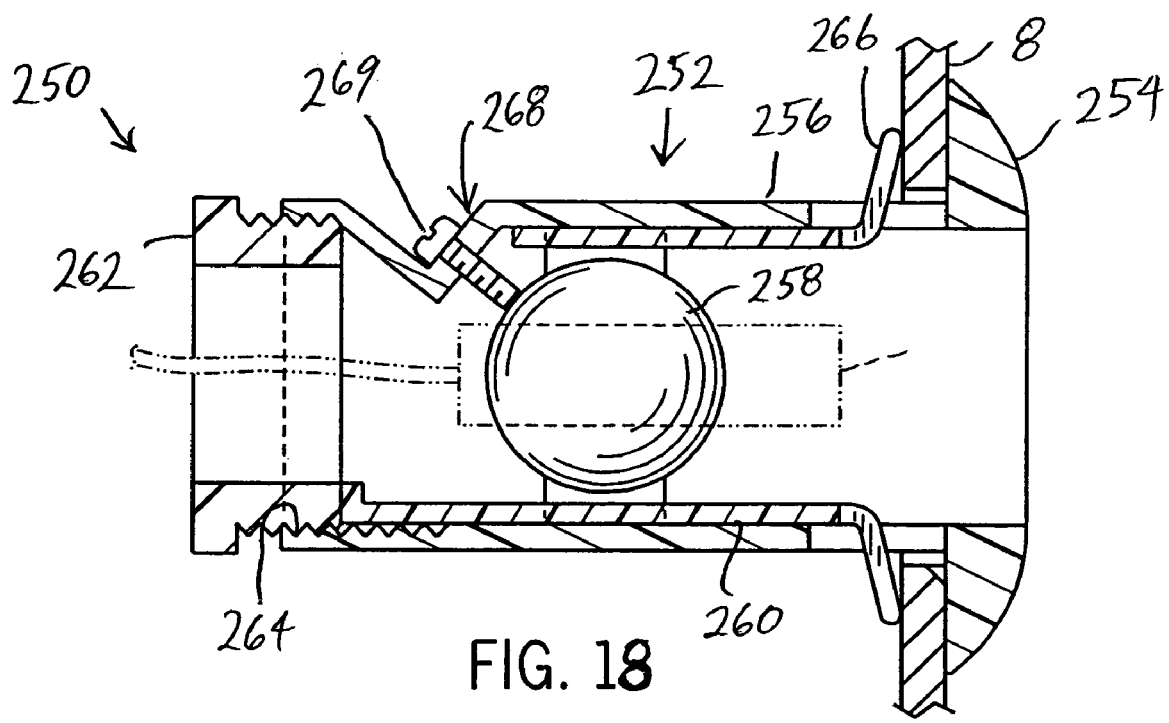
FIG. 18 is a side elevation, cross-sectional view of an additional embodiment of a mounting mechanism that employs a swivel ball, which in this embodiment is set into place using a screw.

Referring to FIG. 18, an additional embodiment of a mounting mechanism 250 is shown. In this embodiment, the mounting mechanism 250 has a generally mushroom-shaped exterior surface including a generally cylindrical stem portion 252 and a circular flange 254 that together form a housing 256. As with the mounting mechanism 130 of FIG. 8, the mounting mechanism 250 also includes a screw portion 262 and a sleeve 260 having tabs 266 that interface a supporting structure 8. The externally-threaded screw portion 262 interfaces interior threads 264 within the housing 256 and, upon inward rotation of the screw portion 262, the sleeve 260 is moved relative to the housing 256 such that the tabs 266 and flange 254 clamp down upon the supporting structure 8. However, in contrast to the embodiment of FIG. 8, the mounting mechanism 250 does not set a position of a swivel ball 258 supported within the housing (and supporting a sensing device 2, shown in phantom) by way of rotation of the screw portion 262 relative to the housing 256. Rather, the housing 256 includes an indented portion 268 situated generally between the axial location of the swivel ball 258 and the axial location of the screw portion 262. A set screw 269 is mounted at an oblique angle directed inward toward the center of the housing 256, such that the set screw 269 when screwed into the housing eventually contacts the swivel ball and, upon sufficient rotation, locks the swivel ball in place.

Figure 19:
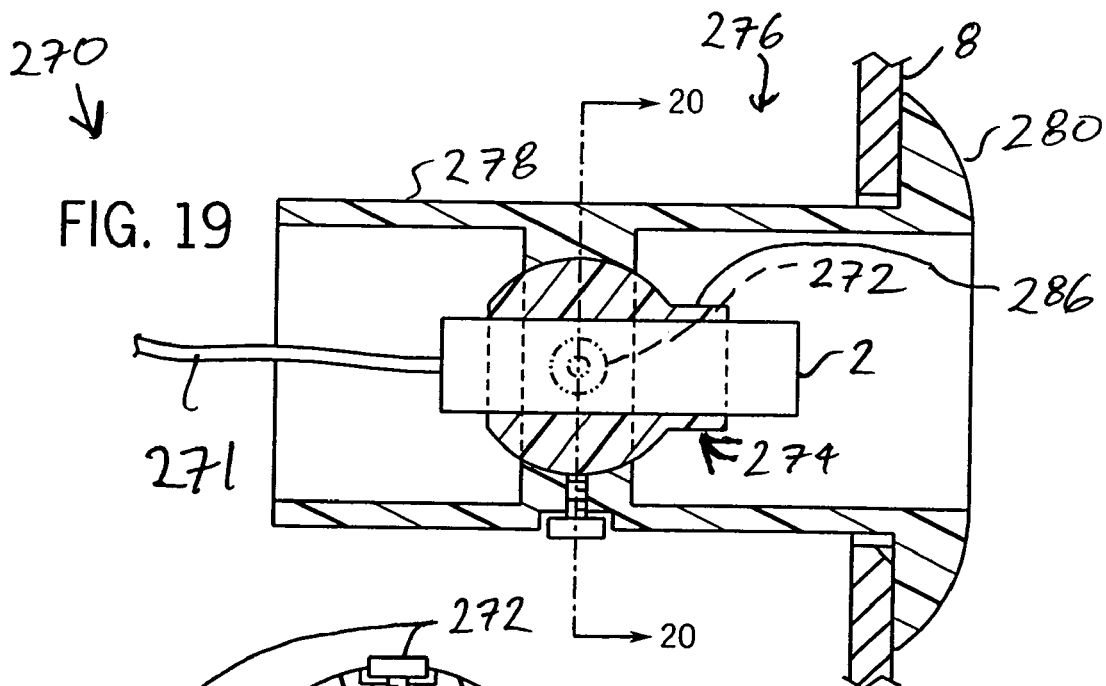
FIG. 19 is a side elevation, cross-sectional view of a further embodiment of a mounting mechanism that employs a swivel ball, which in this embodiment is set into place using multiple set screws.
Figure 20:
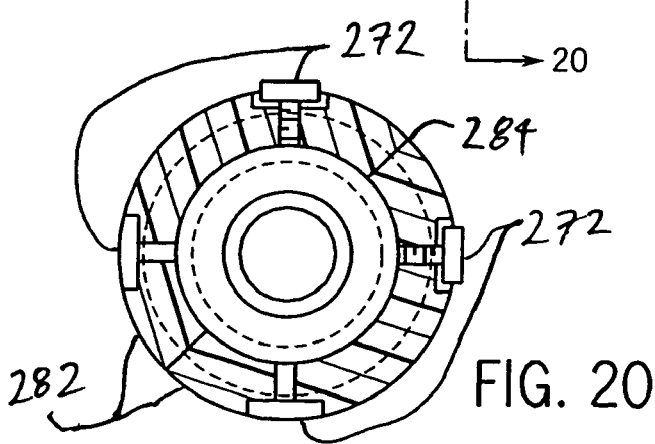
FIG. 20 is a cross-sectional view of the mounting mechanism of FIG. 19, taken along line 20-20 of FIG. 19.

Referring to FIGS. 19 and 20, an additional embodiment of a mounting mechanism 270 in which multiple (in this case, four) set screws 272 are employed to set a position of a swivel ball 274 is shown. In this mounting mechanism 270, which like the previous mounting mechanisms employs a housing 276 with a cylindrical portion 278 and a circular flange 280, the four set screws 272 are used to set the position of the swivel ball 274, which supports therewithin a sensing device 2. Although not shown, the mounting mechanism 270 could employ a sleeve or other mechanism for fixing the housing 276 in relation to the supporting structure 8. As shown particularly by FIG. 20, in the present embodiment, the housing 276 is formed from two identical halves 282 and are mated to one another along a split line 284. Through the use of the two symmetric housing halves, manufacture and assembly of the housing is simplified, and assembly of the two halves can be achieved by way of snaps, fasteners, adhesives, dovetails, welding, tongue-in-groove connections, and other fastening mechanisms. Also in contrast to the previous embodiments, the swivel ball 274 is shown to have a cylindrical, non-spherical extension 286 that can, in at least some embodiments, be contacted in order to facilitate movement of the sensing device/swivel ball, and also can be used to help further support the sensing device. As discussed earlier, in some embodiments the setting of the position of the swivel ball/sensing device can be achieved/facilitated by pulling or otherwise directing the location of a wire/cable 271 extending from the swivel ball/sensing device.

Although a variety of embodiments are described above and/or shown in the FIGS., numerous other variations other than those discussed or shown are also possible. For example, although some of the above-described embodiments employ mounting mechanisms having sleeves that are internal or external to the respective housing mechanism, it should be understood that, where an internal sleeve is only shown, it would also be possible to have a device employing an external sleeve, and vice-versa. Likewise, while embodiments having externally-threaded screw portions have been shown most commonly in the embodiments described above, similar mounting mechanisms could employ nuts with internal threads that were employed in conjunction with externally-threaded housings such as the embodiment shown in FIG. 17. Additionally, in some embodiments, other types of actuating components could be used in place of threaded nuts or screw portions.

Additionally, while each of the above-described embodiments is substantially mushroom-shaped and, in particular, is largely cylindrical, in alternate embodiments it would not be necessary for the exterior surface of the mounting mechanism to be shaped in this manner. Rather, mounting mechanisms having a variety of cross-sectional shapes could be designed that would operate similarly to those discussed herein. For example, the mounting mechanism shown in FIG. 8 could be modified such that each of the flange 134, the housing 136 and the sleeve 140 were substantially rectangular in cross-section.

Such a design could still employ a screw portion that was screwed into an end (e.g., an end with an inner surface that was cylindrical and threaded along its interior) so as to achieve movement of a sleeve that would result in clamping of the mounting mechanism to a supporting structure and/or result in the setting of a position of a swivel ball.

Further, one or more of the various advantages achieved by different embodiments of the present invention could be implemented in conjunction with other types of mounting mechanism features, some of which are not necessarily disclosed in detail herein, to arrive at additional mounting mechanisms that comprised within the present invention. For example, certain of the embodiments of the present invention employing a housing and a sleeve that were slidably removable in relation to one another could also be implemented in connection with one or more of the features disclosed in U.S. patent application Ser. No. 11/240,034 entitled "Sensor Mounting Structure Allowing For Adjustment Of Sensor Position" filed on even date herewith, which is hereby incorporated by reference herein, a number of which allow for the control and setting of orientations of the sensing devices within a mounting mechanism. Likewise, for example, certain of the features described herein relating to the setting of a position of a swivel ball could be implemented in connection with features of mounting mechanisms allowing for the mounting mechanisms to be easily snapped into place relative to a supporting structure, for example, certain of the features described in U.S. patent application Ser. No. 11/240,175 entitled "Sensor Mounting Structure With Snapping Feature" filed on even date herein, which is incorporated by reference herein. Also, various features of the present invention could be implemented in connection with mounting mechanism features described in U.S. patent application Ser. No. 11/240,019 entitled "Sensor Mounting Structure With Light Pipe" filed on even date herewith, which is incorporated by reference herein.

It is specifically intended that the present invention not be limited to the embodiments and illustrations contained herein, but include modified forms of those embodiments including portions of the embodiments and combinations of elements of different embodiments as come within the scope of the following claims.

We claim:

1. A mounting device for supporting a sensing device in relation to a supporting structure, the mounting device comprising:
   a first housing portion having a first appendage;
   a second housing portion, wherein the second housing portion is slidable in relation to the first housing portion; and
   an actuating portion capable of causing sliding movement between the first and second housing portions,
   wherein the sensing device is supported within at least one of the first and second housing portions,
   wherein the second housing portion includes a sleeve,
   wherein the sleeve is supported around an exterior surface of the first housing portion, and
   wherein the actuating portion has at least one of interior threads and exterior threads configured for mating with complementary threads existing on the first housing portion.

2. The mounting device of claim 1, wherein the actuating portion is capable of causing the sleeve and the first housing portion to slide relative to one another so that the sleeve and the first appendage apply opposing forces upon the supporting structure such that the mounting device is at least one of attached to and rotatably coupled to the supporting structure.

3. The mounting device of claim 1, wherein the second housing portion has a second appendage; and wherein the second appendage is a mounting flange proximate a first end of the second housing portion, and at least one of the first and second housing portions includes an orifice by way of which the sensing device is capable of receiving a light signal.

4. The mounting device of claim 1, wherein:
   a) at least one of the first and second housing portions includes a crumple zone portion; or
   b) the actuating portion is a screw-type component having a rubberized ring extending around its perimeter proximate a first end of the screw-type component that is inserted within at least one of the first and second housing portions; or
   c) a swivel ball is located internally with respect to at least one of the first and second housing portions.

5. A sensor assembly employing the mounting device and sensing device of claim 1.

6. A conveyor section for use in an assembly line comprising the sensor assembly of claim 5.

7. A mounting device for supporting a sensing device in relation to a supporting structure, the mounting device comprising:
   a first housing portion having a first appendage;
   a second housing portion having a second appendage, wherein the second housing portion is slidable in relation to the first housing portion; and
   an actuating portion capable of causing sliding movement between the first and second housing portions,
   wherein the sensing device is supported within at least one of the first and second housing portions,
   wherein the first housing portion is a sleeve,
   wherein the sleeve is supported around an exterior surface of the second housing portion,
   wherein the first appendage is a lip at a first end of the sleeve, and wherein the actuating portion is configured to interface a second end of the sleeve, and
   wherein the actuating portion is a nut having interior threads configured for mating with exterior threads existing around at least a portion of the exterior surface of the second housing portion.

8. The mounting device of claim 7, wherein at least one of the first and second housing portions is at least one of cylindrical, tubular, and box-shaped.

9. The mounting device of claim 7, wherein the actuating portion is capable of causing the first and second housing portions to slide relative to one another so that the first and second appendages apply opposing forces upon the supporting structure such that the mounting device is at least one of attached to and rotatably coupled to the supporting structure.

10. The mounting device of claim 7, wherein the second appendage is a mounting flange proximate a first end of the second housing portion, and at least one of the first and second housing portions includes an orifice by way of which the sensing device is capable of receiving a light signal.

11. The mounting device of claim 7, wherein:
   a) at least one of the first and second housing portions includes a crumple zone portion; or
   b) a swivel ball is located internally with respect to at least one of the first and second housing portions.

12. A mounting device for supporting a sensing device in relation to a supporting structure, the mounting device comprising:
   a first housing portion having a first appendage;

a second housing portion having a second appendage, wherein the second housing portion is slidable in relation to the first housing portion; and an actuating portion capable of causing sliding movement between the first and second housing portions, wherein the sensing device is supported within at least one of the first and second housing portions, wherein the first housing portion is a sleeve, wherein a substantial portion of the sleeve is situated within the second housing component, wherein the sleeve further includes at least one tab that protrudes from a first location within the second housing component to a second location outside the second housing component, and wherein the first appendage includes one of the at least one tab.

13. The mounting device of claim 12, wherein the actuating component includes an externally-threaded screw portion configured to mate with internal threads of the second housing component.

14. The mounting device of claim 12, wherein the first appendage is at least one of (1) a combination of an axially-extending segment, a radially-extending segment, and an axially-extending tip; (2) a ramped tab; (3) a tab having an axially-extending segment and a radially-outwardly extending segment; (4) a tab having a bump along a surface intended to interface the supporting structure; and (5) a tab having a radially-outwardly extending segment and a radially-inwardly extending segment.

15. The mounting device of claim 12, wherein the tab is configured to provide at least some spring-like action when the sleeve interfaces the supporting structure.

16. The mounting device of claim 12, wherein the sleeve includes a plurality of alternating fingers and slots.

17. The mounting device of claim 12, wherein the second housing portion includes a plurality of orifices through which the at least one tab can protrude.

18. The mounting device of claim 12, wherein the second appendage is a mounting flange proximate a first end of the second housing portion, and at least one of the first and second housing portions includes an orifice by way of which the sensing device is capable of receiving a light signal.

19. The mounting device of claim 12, wherein:
a) at least one of the first and second housing portions includes a crumple zone portion; or
b) a swivel ball is located internally with respect to at least one of the first and second housing portions.

20. The mounting device of claim 19, wherein the swivel ball is located internally with respect to the at least one housing portion, and wherein the swivel ball is locked into place due to pressure applied to the swivel ball by at least one of a gasket, an O-ring, at least one set screw, and at least one intermediate component positioned between the swivel ball and the actuating portion.

21. A sensor assembly employing the mounting device and sensing device of claim 12.

22. A mounting device for supporting a sensing device in relation to a supporting structure, the mounting device comprising:

a first housing portion having a first appendage;

a second housing portion having a second appendage, wherein the second housing portion is slidable in relation to the first housing portion; and an actuating portion capable of causing sliding movement between the first and second housing portions, wherein the sensing device is supported within at least one of the first and second housing portions, wherein the first housing portion is a sleeve, wherein a substantial portion of the sleeve is situated within the second housing component, and wherein the sleeve includes a first slot that extends along an entire length of the sleeve, whereby the sleeve can be more easily compressed to fit within the second housing portion than if the slot were absent.

23. The mounting device of claim 22, wherein the second appendage is a mounting flange proximate a first end of the second housing portion, and wherein the actuating portion is capable of causing the first and second housing portions to slide relative to one another so that the first and second appendages apply opposing forces upon the supporting structure such that the mounting device is at least one of attached to and rotatably coupled to the supporting structure.

24. A mounting device for supporting a sensing device in relation to a supporting structure, the mounting device comprising:

a first housing portion having a first appendage;

a second housing portion having a second appendage, wherein the second housing portion is slidable in relation to the first housing portion; and an actuating portion capable of causing sliding movement between the first and second housing portions, wherein the sensing device is supported within at least one of the first and second housing portions, wherein the actuating portion is at least one of a nut and a screw-type component.

25. The mounting device of claim 24, wherein at least one of the first and second housing portions is made from a flexible material that is at least one of plastic, rubber, aluminum, and an additional, metal.

26. The mounting device of claim 24, wherein the actuating portion is a screw-type component having a rubberized ring extending around its perimeter proximate a first end of the screw-type component that is inserted within at least one of the first and second housing portions.

27. The mounting device of claim 26, wherein the rubberized ring is configured to interface at least one of the first and second housing portions, whereby a clamping action performed by the first and second appendages upon the supporting structure is facilitated notwithstanding a variation in a tolerance of the supporting structure due to operation of the rubberized ring.

28. The mounting device of claim 24, wherein the second appendage is a mounting flange proximate a first end of the second housing portion, and wherein at least one of the first and second housing portions includes an orifice by way of which the sensing device is capable of receiving a light signal.

29. The mounting device of claim 24, wherein at least one of the first and second housing portions includes a crumple zone portion.

30. The mounting device of claim 29, wherein the crumple zone portion at least one of:
a) abuts the actuating portion;
b) is configured to abut the supporting structure;
c) is configured to be positioned at an intermediate location in between at least one of the first and second appendages and the actuating portion;
d) extends radially inwardly of the first and second housing portions;
e) extends radially outwardly of the first and second housing portions; and
f) forms one of the appendages.

31. The mounting device of claim 24, further comprising a swivel ball located internally with respect to at least one of the first and second housing portions.

32. The mounting device of claim 31, wherein the swivel ball is locked into place due to pressure applied to the swivel ball by at least one of a gasket, an o-ring, at least one set screw, and at least one intermediate component positioned between the swivel ball and the actuating portion.

33. A sensor assembly employing the mounting device and sensing device of claim 24.

34. A mounting device for supporting a sensing device in relation to a supporting structure, the mounting device comprising:
a first housing portion having a first appendage;
a second housing portion having a second appendage, wherein the second housing portion is slidable in relation to the first housing portion; and
an actuating portion capable of causing sliding movement between the first and second housing portions,
wherein the sensing device is supported within at least one of the first and second housing portions,
wherein at least one of the first and second housing portions includes a crumple zone portion.

35. The mounting device of claim 34, wherein the crumple zone portion is located proximate at least one of the actuating portion and the supporting structure, and wherein a clamping action performed by the first and second appendages upon the supporting structure is facilitated notwithstanding a variation in a tolerance of the supporting structure due to operation of the crumple zone portion.

36. The mounting device of claim 34, wherein the crumple zone portion at least one of:
a) abuts the actuating portion;
b) is configured to abut the supporting structure;
c) is configured to be positioned at an intermediate location in between at least one of the first and second appendages and the actuating portion;
d) extends radially inwardly of the first and second housing portions;
e) extends radially outwardly of the first and second housing portions; and
f) forms one of the appendages.

37. The mounting device of claim 34, wherein the actuating portion is capable of causing the first and second housing portions to slide relative to one another so that the first and second appendages apply opposing forces upon the supporting structure such that the mounting device is at least one of attached to and rotatably coupled to the supporting structure.

38. The mounting device of claim 34, wherein the second appendage is a mounting flange proximate a first end of the second housing portion, and wherein at least one of the first and second housing portions includes an orifice by way of which the sensing device is capable of receiving a light signal.

39. The mounting device of claim 34, wherein the actuating portion is at least one of a nut and a screw-type component.

40. The mounting device of claim 39, wherein the actuating portion is the screw-type component, and wherein the screw-type component has a rubberized ring extending around its perimeter proximate a first end of the screw-type component that is inserted within at least one of the first and second housing portions.

41. The mounting device of claim 34, further comprising a swivel ball located internally with respect to at least one of the first and second housing portions.

42. The mounting device of claim 41, wherein the swivel ball is locked into place due to pressure applied to the swivel ball by at least one of a gasket, an o-ring, at least one set screw, and at least one intermediate component positioned between the swivel ball and the actuating portion.

43. A sensor assembly employing the mounting device and sensing device of claim 34.

44. A mounting device for supporting a sensing device in relation to a supporting structure, the mounting device comprising:
a first housing portion having a first appendage;
a second housing portion having a second appendage, wherein the second housing portion is slidable in relation to the first housing portion; and
an actuating portion capable of causing sliding movement between the first and second housing portions,
wherein the sensing device is supported within at least one of the first and second housing portions,
further comprising a swivel ball located internally with respect to at least one of the first and second housing portions.

45. The mounting device of claim 44, wherein the sensing device is at least one of supported by and formed as part of the swivel ball.

46. The mounting device of claim 44, wherein the swivel ball is at least substantially rotatable with respect to the at least one housing portion.

47. The mounting device of claim 46, wherein the swivel ball is supported upon a mounting structure that is at least one of a plurality of mounting feet and a mounting ring support.

48. The mounting device of claim 47, wherein the mounting structure is integrally formed with the first housing portion, wherein a substantial portion of the second housing portion is located within the first housing portion, wherein the swivel ball is located within the substantial portion of the second housing portion, and wherein the mounting structure includes a plurality of structures that extend from a primary body of the first housing portion through slots within the second housing portion to a region within the second housing portion.

49. The mounting device of claim 44, wherein the swivel ball is rotationally oriented due to a force applied to a cable extending from the sensing device, which is supported by the swivel ball.

50. The mounting device of claim 44, wherein the swivel ball is locked into place due to pressure applied to the swivel ball by at least one of a gasket, an o-ring and at least one set screw.

51. The mounting device of claim 50, wherein the swivel ball is locked into place due to pressure applied by the o-ring, which is supported by at least one of the actuating portion and a mounting support for the swivel ball.

52. The mounting device of claim 50, wherein the swivel ball includes a non-spherical extension.

53. The mounting device of claim 44, wherein the swivel ball is locked into a rotational position due at least in part to pressure applied by an intermediate component positioned between the swivel ball and the actuating portion.

54. The mounting device of claim 53, wherein the intermediate component includes at least one keyway configured to receive at least one protrusion extending from at least one of the first and second housing portions, wherein relative rotation between the intermediate component and the at least one housing portion is precluded due to the receiving of the at least one protrusion by the at least one keyway.

55. The mounting device of claim 44, wherein the swivel ball is inserted into the at least one housing portion through a removable door portion.

56. The mounting device of claim 55, wherein the first housing portion is a tube with an orifice, the second housing portion is the removable door portion, and the second appendage is a mounting support attached to the removable door portion capable of being in contact with the swivel ball; and further comprising a nut, wherein the mounting device is attached to the supporting structure due to the nut and the first appendage.

57. The mounting device of claim 44, wherein the swivel ball is locked into place due to tightening of a set screw, wherein the set screw is supported upon at least one of the housing portions, and wherein a set screw axis is rotationally oriented to extend in between a longitudinal axis of the housing portions and a plane perpendicular to the longitudinal axis.

58. The mounting device of claim 44, wherein the actuating portion is capable of causing the first and second housing portions to slide relative to one another so that the first and second appendages apply opposing forces upon the supporting structure such that the mounting device is at least one of attached to and rotatably coupled to the supporting structure.

59. The mounting device of claim 44, wherein the second appendage is a mounting flange proximate a first end of the second housing portion, and wherein at least one of the first and second housing portions includes an orifice by way of which the sensing device is capable of receiving a light signal.

60. The mounting device of claim 44, wherein at least one of the first and second housing portions includes a crumple zone portion.

61. The mounting device of claim 60, wherein the crumple zone portion at least one of:
 a) abuts the actuating portion;
 b) is configured to abut the supporting structure;
 c) is configured to be positioned at an intermediate location in between at least one of the first and second appendages and the actuating portion;
 d) extends radially inwardly of the first and second housing portions;
 e) extends radially outwardly of the first and second housing portions; and
 f) forms one of the appendages.

62. A sensor assembly employing the mounting device and sensing device of claim 44.

63. A mounting device for supporting a sensing device in relation to a supporting structure, the mounting device comprising:
 a first housing portion having a first appendage;
 a second housing portion having a second appendage, wherein the second housing portion is slidable in relation to the first housing portion; and
 an actuating portion capable of causing sliding movement between the first and second housing portions,
 wherein the sensing device is supported within at least one of the first and second housing portions,
 wherein actuation of the actuating portion both causes the first and second appendages to clamp onto the supporting structure and causes a swivel ball associated with the first and second housing portions to be set to a particular rotational orientation.

64. The mounting device of claim 63, wherein the first appendage is a circular flange and the mounting device has a shape generally resembling that of a mushroom.

65. A mounting device for supporting a sensing device in relation to a supporting structure, the mounting device comprising:
 a first housing portion having a first appendage;
 a second housing portion having a second appendage, wherein the second housing portion is slidable in relation to the first housing portion; and
 an actuating portion capable of causing sliding movement between the first and second housing portions,
 wherein the sensing device is supported within at least one of the first and second housing portions, wherein at least one of the first and second housing portions is formed from a combination of first and second symmetrical halves.

66. The mounting device of claim 65, wherein at least one of the first and second housing portions includes an orifice by way of which the sensing device is capable of receiving a light signal.

67. A sensor assembly employing the mounting device and sensing device of claim 65.

68. A mounting device for supporting a sensing device in relation to a supporting structure, the mounting device comprising:
 a tubular support component;
 first means for rotatably supporting the sensing device in relation to the tubular support component; and
 second means for substantially simultaneously coupling the tubular support component in relation to the supporting structure and setting a rotational position of the sensing device,
 wherein the second means includes an additional sleeve component that is slidable in relation to the tubular support component, and
 wherein the second means includes a threaded component capable of applying pressure upon the additional sleeve component.

69. The mounting device of claim 68, wherein the sleeve component includes an appendage that is capable of applying a force to the supporting structure in opposition to another force applied to the supporting structure by another appendage.

70. A method of installing a sensing device in relation to a supporting structure, the method comprising:
 providing first and second housing portions, wherein at least a portion of the first housing portion is within the second housing portion;
 positioning the sensing device within at least one of the first and second housing portions;
 positioning at least one of the first and second housing portions relative to the supporting structure so that the at least one housing portion extends through an orifice within the supporting structure;
 providing an actuating portion onto at least one of the first and second housing portions; and
 rotating the actuating portion relative to at least one of the first and second housing portions,
 wherein the rotating of the actuating portion causes the first and second housing portions to experience sliding movement in relation to one another, and
 wherein the sliding movement of the first and second housing portions causes the first and second housing portions to apply opposing forces upon the supporting structure such that the housing portions are secured in relation to the supporting structure.

71. The method of claim 70, further comprising positioning a swivel ball within at least one of the first and second housing portions, wherein the sensing device is positioned upon the swivel ball.

72. The method of claim 71, further comprising locking the swivel ball in a particular rotational position by applying pressure to the swivel ball by way of at least one of a gasket, an o-ring, at least one set screw, and at least one intermediate component positioned between the swivel ball and the actuating portion.

73. The method of claim 70, wherein at least one of the housing portions includes a crumple zone portion, and wherein the rotating of the actuating portion results in a crumpling of the crumple zone portion.

74. The method of claim 70, wherein the actuating portion is at least one of a nut and a screw-type component.

75. The method of claim 70, wherein the first housing portion includes at least one tab that extends outward through the second housing portion, the at least one tab applying at least one of the opposing forces upon the supporting structure.

* * * * *